United States Patent
Chu et al.

(10) Patent No.: US 9,143,195 B2
(45) Date of Patent: Sep. 22, 2015

(54) SYSTEMS AND METHODS FOR COMMUNICATING AMONG NETWORK DISTRIBUTION POINTS

(75) Inventors: Fred Chu, Madison, AL (US); Kenneth D. Ko, Clearwater, FL (US); Richard Goodson, Huntsville, AL (US); Kevin W. Schneider, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 831 days.

(21) Appl. No.: 13/178,249

(22) Filed: Jul. 7, 2011

(65) Prior Publication Data

US 2013/0010585 A1 Jan. 10, 2013

(51) Int. Cl.
*H04J 1/12* (2006.01)
*H04L 12/66* (2006.01)
*H04B 3/32* (2006.01)

(52) U.S. Cl.
CPC ........................................ *H04B 3/32* (2013.01)

(58) Field of Classification Search
CPC .......................................................... H04J 3/10
USPC .......................................................... 370/201
See application file for complete search history.

(56) References Cited

U.S. PATENT DOCUMENTS

| | | | |
|---|---|---|---|
| 5,887,032 A | 3/1999 | Cioffi | |
| 5,901,205 A | 5/1999 | Smith et al. | |
| 6,178,217 B1 * | 1/2001 | Defries et al. | 375/377 |
| 6,507,608 B1 | 1/2003 | Norrell | |
| 7,035,323 B1 | 4/2006 | Arato et al. | |
| 7,158,563 B2 | 1/2007 | Ginis et al. | |
| 7,349,480 B2 | 3/2008 | Tsatsanis et al. | |
| 7,394,752 B2 | 7/2008 | Hasegawa et al. | |
| 7,457,284 B2 * | 11/2008 | Gerszberg et al. | 370/354 |
| 7,639,596 B2 | 12/2009 | Cioffi | |
| 7,693,090 B1 | 4/2010 | Kimpe | |
| 7,760,624 B1 | 7/2010 | Goodson | |
| 8,411,696 B1 | 4/2013 | Ko et al. | |
| 8,582,425 B1 | 11/2013 | Turner et al. | |
| 2003/0048802 A1 | 3/2003 | Shenoi | |
| 2003/0091053 A1 | 5/2003 | Tzannes et al. | |
| 2004/0109546 A1 | 6/2004 | Fishman | |

(Continued)

OTHER PUBLICATIONS

International Telecommunication Union, ITU-T G.993.2, Series G: Transmission Systems and Media, Digital System and Networks, "Very High Speed Digital Subscriber Line Transceivers2 (VDSL2)," pp. 80-82, 2006.

(Continued)

*Primary Examiner* — Gerald Smarth
(74) *Attorney, Agent, or Firm* — Maynard Cooper & Gale, P.C.; Jon E. Holland

(57) ABSTRACT

A communication system has a trunk extending from a network facility, such as a central office, with a plurality of distribution points positioned along the trunk. Each leg of the trunk defines a shared channel that permits peak data rates much greater than what would be achievable without channel sharing. As an example, the connections of each respective trunk leg may be bonded. Further, the same modulation format and crosstalk vectoring are used for each leg of the trunk. The crosstalk vectoring cancels both far-end crosstalk (FEXT) that couples between connections of a given trunk leg and crossover crosstalk that couples between one trunk leg and another. In addition, logic determines an amount of excess capacity available for each leg of the trunk and controls error correction based on the determined excess capacity.

22 Claims, 15 Drawing Sheets

(56) References Cited

U.S. PATENT DOCUMENTS

| | | | |
|---|---|---|---|
| 2005/0074057 A1* | 4/2005 | Bremer et al. | 375/222 |
| 2005/0152385 A1* | 7/2005 | Cioffi | 370/420 |
| 2007/0201346 A1* | 8/2007 | Geile et al. | 370/203 |
| 2007/0300278 A1* | 12/2007 | Carey et al. | 725/119 |
| 2008/0273548 A1* | 11/2008 | Leano et al. | 370/442 |
| 2009/0092242 A1 | 4/2009 | Cooke et al. | |
| 2010/0074312 A1* | 3/2010 | Cioffi et al. | 375/222 |
| 2011/0103274 A1* | 5/2011 | Vavik | 370/293 |

OTHER PUBLICATIONS

International Telecommunication Union, ITU-T G.993.5, Series G: Transmission Systems and Media, Digital System and Networks, "Self-FEXT cancellation (vectoring) for use with VDSL2 transceivers," 2010.

Ko, et al., U.S. Appl. No. 12/839,400, entitled, "Systems and Methods for Communicating with Multiple Distribution Points of a Network," filed Jul. 19, 2010.

Schneider, et al., U.S. Appl. No. 12/839,403, entitled, "Systems and Methods for Powering a Service Unit," filed Jul. 19, 2010.

Schneider, et al., U.S. Appl. No. 12/839,402, entitled, "Communication Systems and Methods for Using Shared Channels to Increase Peak Data Rates," filed Jul. 19, 2010.

Turner, et al., U.S. Appl. No. 13/016,680, entitled, "Systems and Methods for Canceling Crosstalk in Satellite Access Devices," filed Jan. 28, 2011.

\* cited by examiner

SYSTEMS AND METHODS FOR COMMUNICATING AMONG NETWORK DISTRIBUTION POINTS

RELATED ART

Telecommunication services have historically been delivered over the "last mile" (between a local exchange and the customer premises) over copper cable facilities. To support high-speed data services over these facilities, service providers employ digital communication links, such as Asymmetric Digital Subscriber Line (ADSL) or other similar technologies over these copper facilities. A characteristic of DSL and the copper channel is that the achievable data rate decreases as the length of the copper pair increases. Therefore, to offer higher data rates, service providers have shortened the effective length of the copper pair by moving the service provider transceiver of the DSL link from the exchange to an intermediate point in the cable and using a shared fiber-optic facility to transport the signals between the exchange and the intermediate point (or node).

Despite increases in data rates enabled by shortening the length of the copper facilities, the peak data rates for DSL services typically fall below those offered by Data Over Cable Service Interface Specification (DOCSIS) services. In this regard, a DOCSIS system uses coaxial cable, which permits a much higher peak data rate for a given subscriber than that available via conventional DSL over copper facilities. However, the coaxial cable is shared among many customers such that the actual data rate provided to a particular customer, depending on the number of customers actively communicating via the DOCSIS system, is often much less and, at times, below the data rates afforded by DSL. Nevertheless, in competing for customers, the provider of a DOCSIS system often touts the peak data rates afforded by the DOCSIS system without focusing on the fact that the channel is shared and the average data rate, therefore, decreases as more and more customers become active.

Note that a variety of DSL formats have proven effective in competing with DOCSIS. Very-high-bit-rate DSL (VDSL) is a solution that is particularly attractive due to the relatively high data rates enabled by VDSL as compared to other DSL solutions. Indeed, first generation VDSL provides data transmission up to about 52 Mega-bits per second (Mbps) downstream and about 16 Mbps upstream. Second generation VDSL, sometimes referred to as VDSL2, provides up to about 100 Mbps simultaneously in the both the upstream and downstream directions.

Like several other DSL technologies, VDSL suffers from the effects of crosstalk. Current VDSL standards specify vectoring techniques that allow crosstalk cancellation, and such techniques have been employed to cancel the crosstalk among subscriber lines in an effort to improve the performance of VDSL signals and allow for longer reaches.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for communicating among network distribution points. In one exemplary embodiment, shared digital communication links, such as DSL links, are used to carry data between a first network point, such as a feeder distribution interface (FDI) or a central office (CO), and one or more distribution points (DPs). Non-shared links may then carry the data from any of the DPs. In one exemplary embodiment, the shared links are bonded to create a high-speed, shared data channel that permits peak data rates much greater than what would be achievable without channel sharing. For example, if there is only one customer active during a particular time period, then all of the capacity of the bonded channel is used to service such customer permitting a relatively high peak data rate for the customer. As more customers become active or, in other words, actively communicate via the bonded channel, the capacity of the channel is divided among the active customers. In such case, each customer's average data rate is below the peak data rate afforded by the system, but each active customer nevertheless benefits by the idleness of the other customers who are not actively communicating. Moreover, by enabling greater peak data rates, the system can be more competitive with other communication systems, such as DOCSIS systems, which enable relatively high peak data rates as described above.

To improve the quality of communication across DSL links and allow for longer reaches, crosstalk vectoring is employed.

In one exemplary embodiment, a high bandwidth modulation format, such as VDSL, is employed to communicate on both a network side and a customer premises (CP) side of a DP. Crosstalk vectoring is then used to cancel far-end crosstalk (FEXT) as well as crosstalk, referred to herein as "crossover crosstalk," that couples from one side of the DP to the other.

In addition, at each DP, logic is configured to dynamically manage the data rates occurring across the shared communication lines serviced by the DP. When there is available capacity, the logic enables forward error correction (FEC) encoding and controls the parity level of the FEC encoding (e.g., the number of parity bits per frame) based on the amount of available capacity.

Figure 1:
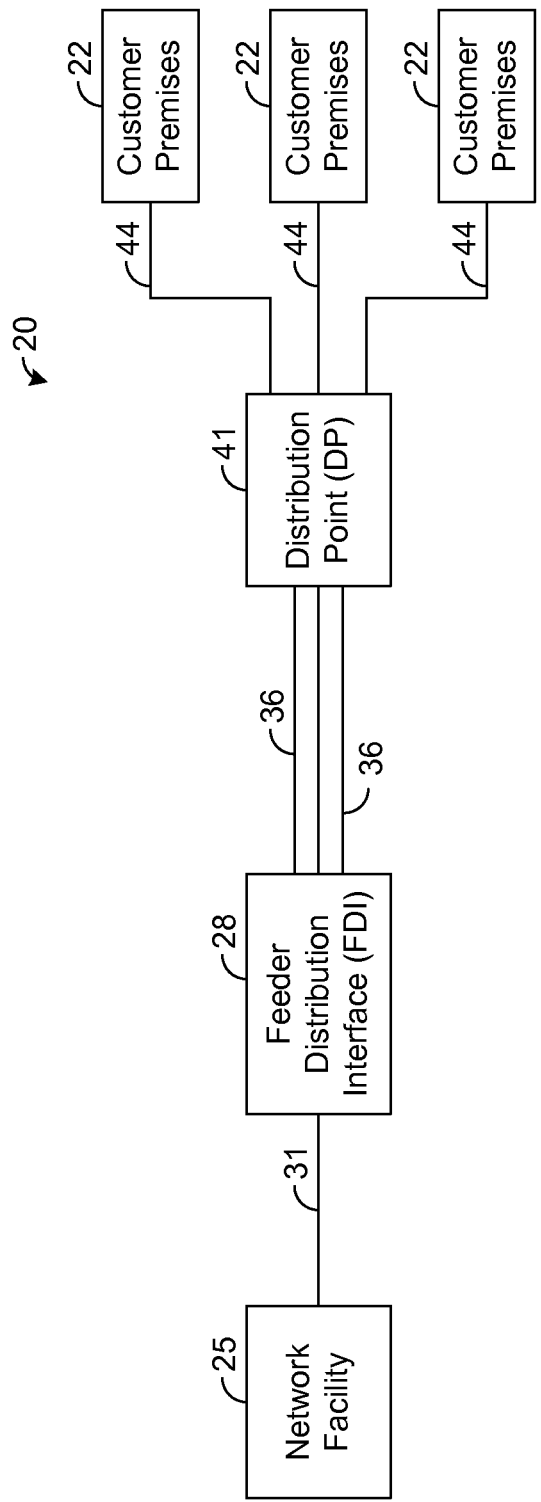
FIG. 1 is a block diagram illustrating a conventional communication system.

FIG. 1 depicts a conventional system 20 for communicating data between a plurality of customer premises 22 and a network facility 25, such as a central office. An optical fiber 31 extends from the network facility 25 to a feeder distribution interface (FDI) 28. The optical fiber 31 provides a high-speed channel that carries data for a plurality of customer premises 22. Equipment at the FDI 28 demultiplexes data from the optical fiber 31 onto a plurality of connections 36, such as twisted-wire pairs, that extend to a distribution point (DP) 41. The FDI equipment multiplexes data in the reverse path from the communication connections 36 onto the optical fiber 31. In this conventional system 20, there is generally a one-to-one correspondence between a twisted-wire pair running from the FDI 28 to the DP 41 and a twisted-wire pair running from the DP 41 to a customer premises 22, and there is no bonding between the FDI 28 and the DP 41 in the system 20 shown by FIG. 1. In some cases when multiple subscriber lines extend to the same customer premises 22, the links extending from an intermediate point, such as the FDI 28, to such customer premises 22 may be bonded, but such bonded links are not shared by multiple subscribers.

As shown by FIG. 1, the DP 41 is coupled to at least one customer premises 22 via at least one conductive connection 44, such as a twisted-wire pair. The physical connection 44 from the DP 41 to a customer premises 22 is typically referred to as a "drop wire" or a "drop connection." The length of a drop connection 44 is usually short, about 500 feet or less.

The portion of the system 20 from the network facility 25 to the FDI 28 is referred to as the "feeder plant," and the portion of the system 20 from the FDI 28 to the DP 41 is referred to as the "distribution plant." DSL (e.g., Asymmetric DSL (ADSL), Single-pair High-speed DSL (SHDSL), or Very-high-speed DSL (VDSL)) or other modulation techniques and protocols may be employed between the FDI 28 and the customer premises 22.

When DSL is employed between the FDI 28 and customer premises 22, the element that multiplexes data from the DSL links onto a fiber link (and demultiplexes the reverse path) is often referred to as a DSL Access Multiplexer (DSLAM). The DSLAM often performs some level of concentration. In this regard, the data rate on the fiber optic link often is less than the sum of the data rates on all of the DSL links, and the DSLAM uses statistical multiplexing of data packets (either variable length frames or fixed length frames often referred to as cells) to combine (or separate, depending on the direction the data is being transmitted) the different data streams from (or to) their respective DSL links.

There are some natural preferred locations for the DSLAM due to the design of the existing copper infrastructure. In this regard, there are often wiring terminals located at the junction between the feeder plant and the distribution plant (i.e., the FDI 28) and at the junction between the distribution plant and the drop wire (i.e., the DP 41) that provide access to the individual pairs, allowing individual pairs from one section to be connected to the other. These terminals also provide a natural location for the intermediate point DSLAM because of the ease of accessing the individual pairs to inject the DSL signal. When a fiber-fed DSLAM is located at the FDI 28, the architecture is often referred to as fiber-to-the-node (FTTN), and when the DSLAM is located at the DP 41, the architecture is often referred to as fiber-to-the-curb (FTTC). Note that the junction between the distribution and the drop goes by several names around the world, and terms other than the "distribution point" may be used to describe such junction. Note also that the junction between the feeder plant and the distribution goes by several names around the world, and terms other than the "feeder distribution interface" may be used to describe such junction.

FTTC architectures offer more flexibility in the technology and modulation format used in the digital transceiver because a drop cable often only contains pairs destined for a single customer premises. Because spectrum compatibility with signals to other customer premises is not required, it is often possible to use transceivers with lower complexity, cost, and power consumption than might be required in a FTTN architecture. In addition, the short length of the drop wire (typically about 500 feet or less) allows for a high data rate, potentially in excess of 100 Megabits per second (Mbps) in each direction. FTTC architectures have been deployed using ADSL links, VDSL links and 10BASE-T Ethernet links in the past.

Figure 2:
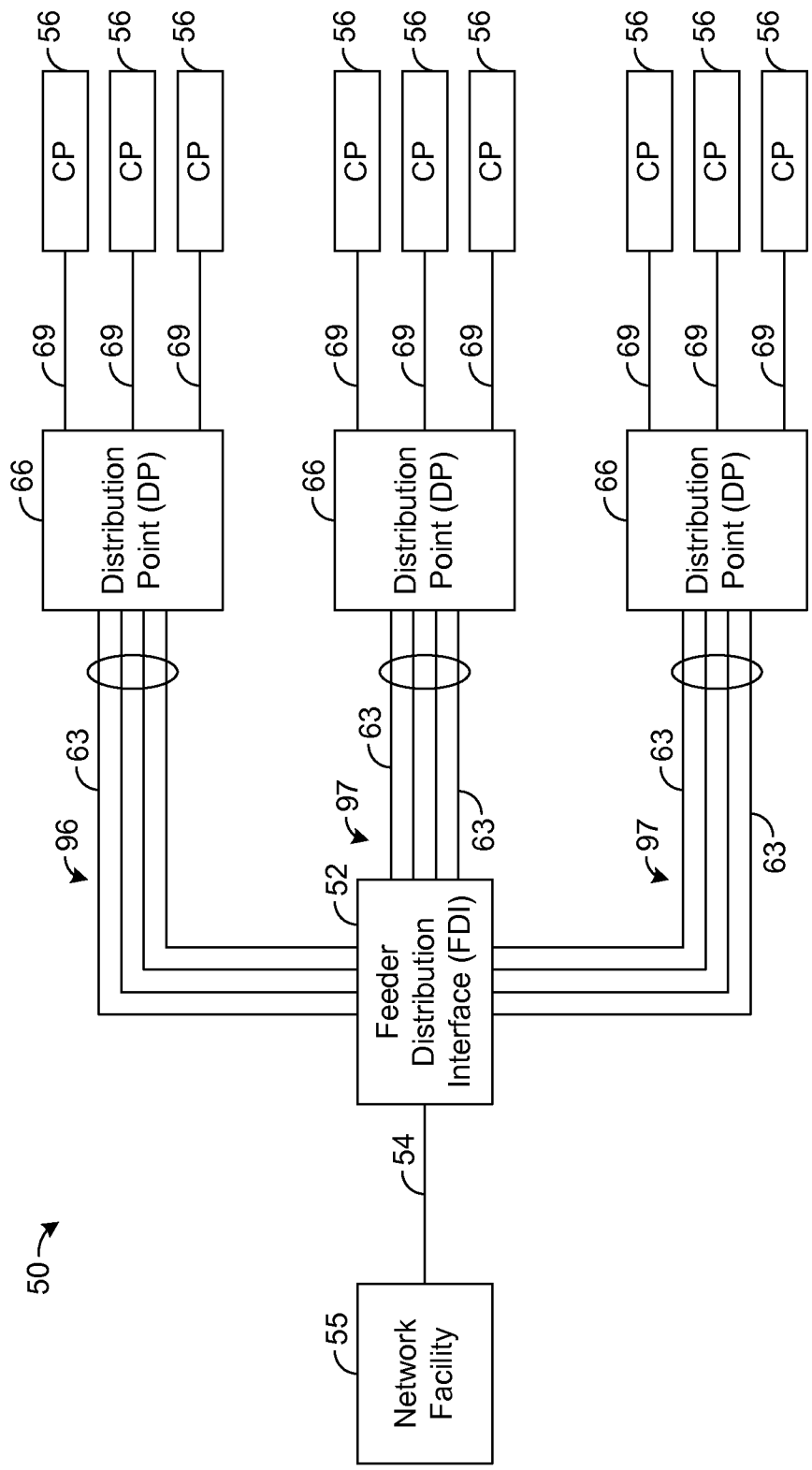
FIG. 2 is a block diagram illustrating an exemplary embodiment of a communication system in accordance with the present disclosure.

However, FTTC architectures require the installation of substantially more fiber routes than FTTN architectures. Thus, FTTN architectures have substantial cost saving benefits when working in a "brownfield" environment, where copper cable is already installed in the distribution plant FIG. 2 depicts an exemplary embodiment of a communication system 50 that has an FTTN architecture and provides relatively high peak data rates. Similar to the conventional system 20, the system 50 shown by FIG. 2 has a feeder distribution interface (FDI) 52 that is coupled to an optical fiber 54 extending from a network facility 55, such as a central office. The optical fiber 54 provides a high-speed channel that carries data for a plurality of customer premises 56. The FDI 52 demultiplexes data from the optical fiber 54 onto a plurality of conductive connections 63, such as twisted-wire pairs, that extend to a plurality of distribution points (DPs) 66. The FDI 52 multiplexes data in the reverse path from the communication links 63 onto the optical fiber 54.

As shown by FIG. 2, each DP 66 is coupled to at least one customer premises 56 via at least one conductive connection 69, such as a twisted-wire pair, referred to as a "drop connection." The exemplary embodiment shown by FIG. 2 depicts three customer premises 56 serviced by each DP 66, but any number of customer premises 56 may be serviced by any of the DPs 66 in other embodiments. In one exemplary embodiment, Ethernet protocol is used to communicate data across the connections 69, but other protocols may be used in other embodiments. Furthermore, for illustrative purposes, it will be assumed hereafter that DSL transceivers are used for the communication across each of the connections 63, but other types of transceivers may be used in other embodiments.

As will be described in more detail below, the connections 63 extending between the FDI 52 and a given DP 66 are bonded to provide a shared, high-speed data channel between the FDI 52 and such DP 66. This is in contrast to the conventional system 20 of FIG. 1 in which the connections 36 between the FDI 28 and DP 41 are not bonded. As described above, the data for a given drop connection 44 of the system 20 is carried by only one of the connections 36 between the FDI 28 and DP 41.

Figure 3:
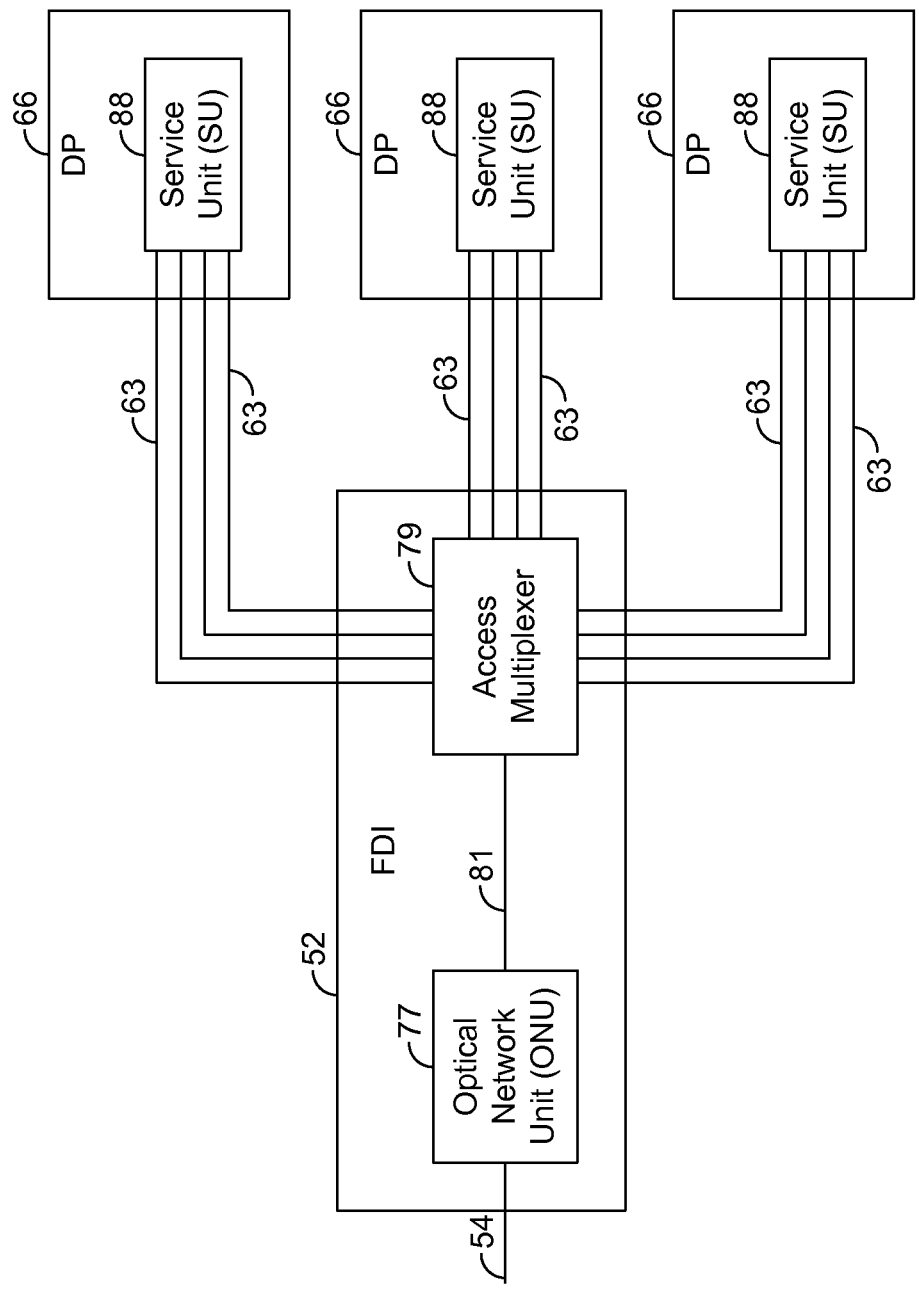
FIG. 3 is a block diagram illustrating an exemplary embodiment of a feeder distribution interface (FDI), such as is depicted by FIG. 2.

FIG. 3 shows an exemplary embodiment of the FDI 52. The FDI 52 comprises an optical network unit (ONU) 77 that is coupled to an access multiplexer 79 via a conductive connection 81. The access multiplexer 79 and the ONU 77 are shown separately, but the functionality of the ONU 77 may be incorporated into the access multiplexer 79 such that a single device performs optical/electrical conversions, as well as multiplexing/demultiplexing. Note that the access multiplexer 79 may reside at various locations. As an example, the access multiplexer 79 may be in close proximity to or in the same cabinet as a cross-connect point of the FDI 52 used for coupling the access multiplexer 79 to the connections 63 and the ONU 77. In another exemplary embodiment, the access multiplexer 79 resides at a central office and interfaces to the loop plant through a distribution frame. Yet other locations of the access multiplexer 79 are possible.

The ONU 77 receives the optical data signal from the fiber 54 and demodulates the optical data signal to recover the data carried by such signal. The ONU 77 then transmits a high-speed data stream to the access multiplexer 79 carrying the data destined for each of the customer premises 56. Thus, the ONU 77 receives the optical data signal transmitted across the fiber 54 and converts the received optical data signal into an electrical signal carrying the data destined for the customer premises 56.

As shown by FIG. 3, the access multiplexer 79 is coupled to a service unit 88 at each respective DP 66 via a plurality of conductive connections 63. In one exemplary embodiment, the access multiplexer 79 communicates DSL signals, such as VDSL signals, across the connections 63 and may be referred to as a DSL access multiplexer or DSLAM. In other embodiments, other types of signals may be communicated across the connections 63.

In one exemplary embodiment, the access multiplexer 79 and the service units 88 are configured to employ bonding techniques in order to bond the connections 63 extending between such access multiplexer 79 and service units 88 such that the connections 63 form a high-speed, bonded data channel for each respective service unit 88. In this regard, as known in the art, the bonding of communication connections generally refers to a process of fragmenting packets of a high-speed data stream for transmission across such connections such that each fragment is transmitted across a respective one of the connections. The fragments are re-combined at the other end of the connections to recover the high-speed data stream. Thus, a plurality of bonded connections, collectively referred to as a "bonding group," can be used to achieve an aggregate data rate that is higher than the data rate afforded by any one of the connections. Exemplary bonding techniques are described in commonly-assigned U.S. Pat. No. 7,693,090, entitled "Systems and Methods for Discovery of PME Bonding Groups," and filed on Nov. 14, 2006, which is incorporated herein by reference. Exemplary bonding techniques are also described in commonly-assigned U.S. patent Ser. No. 11/074,918, entitled "Network Access Device and Method for Protecting Subscriber Lines," and filed on Mar. 8, 2005, which is incorporated herein by reference.

Generally, during bonding, a packet is fragmented by logic, sometimes referred to as a "bonding engine," on one side of a communication channel comprising a plurality of links. For each fragment, a small amount of overhead, such as a sequence indicator indicating the fragment's sequence among all of the packet's fragments, is appended to the fragment. The fragments are transmitted through the channel, and any fragment may travel across any link of the channel. A bonding engine on the opposite side of the channel uses the sequence indicators to reassemble the fragments into the packet originally fragmented prior to transmission through the channel, and the packet ordering is maintained.

Note that the embodiment shown by FIG. 3 is exemplary. Any number of DPs 66 can be serviced by the FDI 52, and the FDI 52 may include any number of ONUs 77 and access multiplexers 79. Further, as described above, the access multiplexer 79 can be configured to perform optical/electrical conversions so that a separate ONU 77 is not necessary. In addition, any number of connections 63 can extend between the access multiplexer 79 and any of the service units 88. The optical network that provides the optical data signal can be a passive optical network (PON). However, other optical networks may be used to provide the optical signal in other embodiments.

It is also possible and likely for data to flow in the opposite direction as that described above. In this regard, an access multiplexer 79 may receive data from any customer premises 56 serviced by it. For any such CP data received from the connections 63, the access multiplexer 79 multiplexes such data into a data stream for transmission to the ONU 77, which converts the data stream into an optical data signal for transmission across the optical fiber 54.

Figure 4:
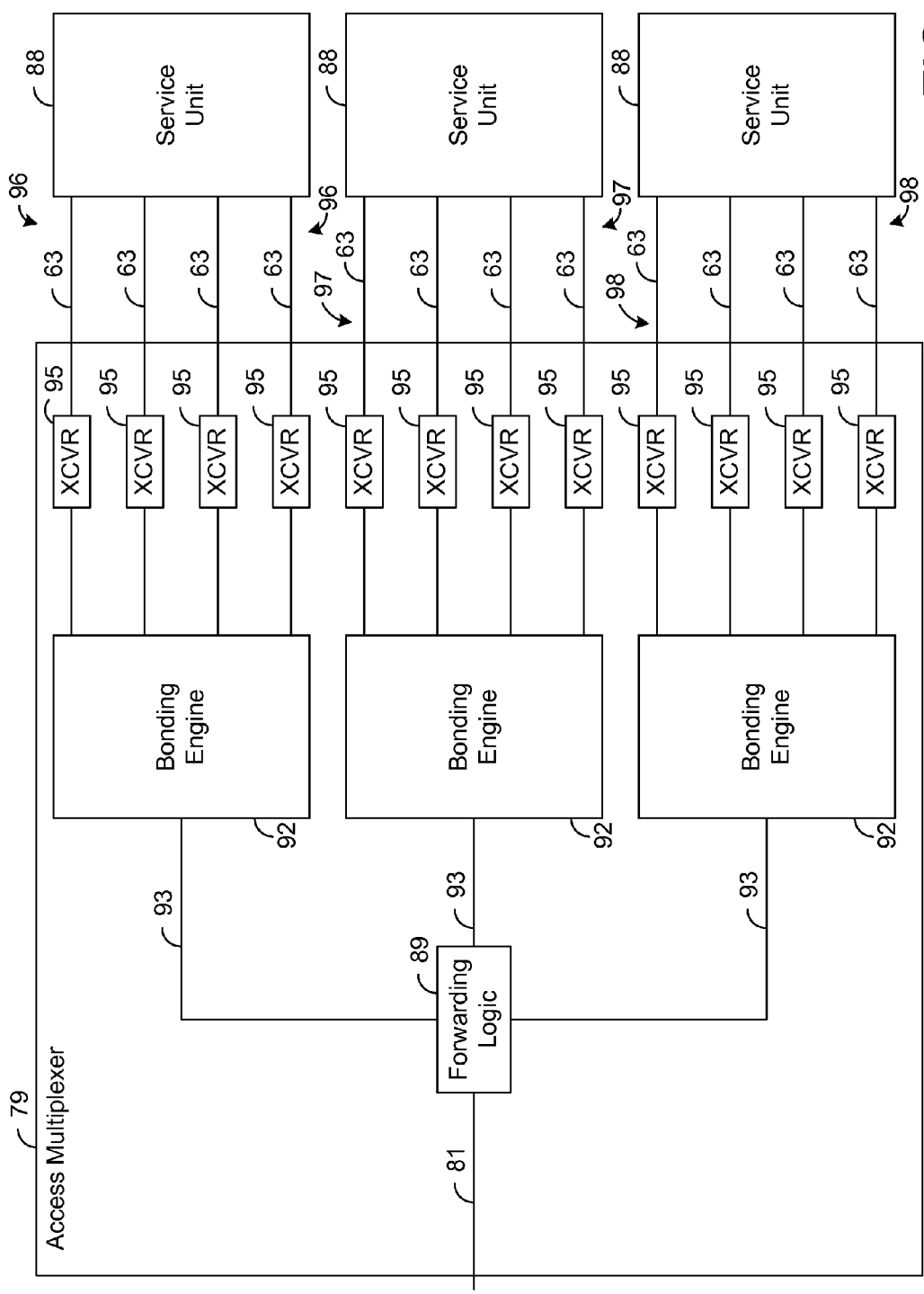
FIG. 4 is a block diagram illustrating an exemplary embodiment of an access multiplexer, such as is depicted by FIG. 3.

FIG. 4 depicts an exemplary embodiment of the access multiplexer 79. The access multiplexer 79 has forwarding logic 89 that is coupled to the electrical connection 81 carrying the high-speed data stream from the ONU 77 (FIG. 3). The forwarding logic 89 is configured to selectively forward the data packets received from such high-speed data stream to a plurality of bonding engines 92 via conductive connections 93. In this regard, the forwarding logic 89 is configured to forward the data packets based on their destination addresses such that they ultimately pass through the appropriate service unit 88 and are received at the appropriate customer premises 56.

Each bonding engine 92 is configured to divide into fragments its respective data stream received from the forwarding logic 89 for transmission across the communication connections 63 to its respective service unit 88. Specifically, each bonding engine 92 fragments received data packets into a plurality of fragments and transmits each fragment to a respective one of the transceivers 95 coupled to it. In some cases, such as for small data packets, a received packet might not be fragmented and, thus, pass through the bonding engine 92 unchanged. The exemplary embodiment of FIG. 4 shows three bonding engines 92, each forming a respective bonding group 96-98. However, in other embodiments, other numbers of bonding engines and/or bonding groups are possible.

Each transceiver 95 has circuitry for terminating a respective connection 63. Each transceiver 95 also modulates a carrier signal using the data fragments received from the bonding engine 92 coupled to it and transmits the modulated signal across a respective connection 63 to a service unit 88 at a DP 66. Thus, data from the optical data signal carried by the fiber 54 (FIG. 3) is divided across the connections 63. In one exemplary embodiment, each transceiver 95 employs a DSL protocol (e.g., VDSL), but other types of protocols may be used in other embodiments.

Figure 5:
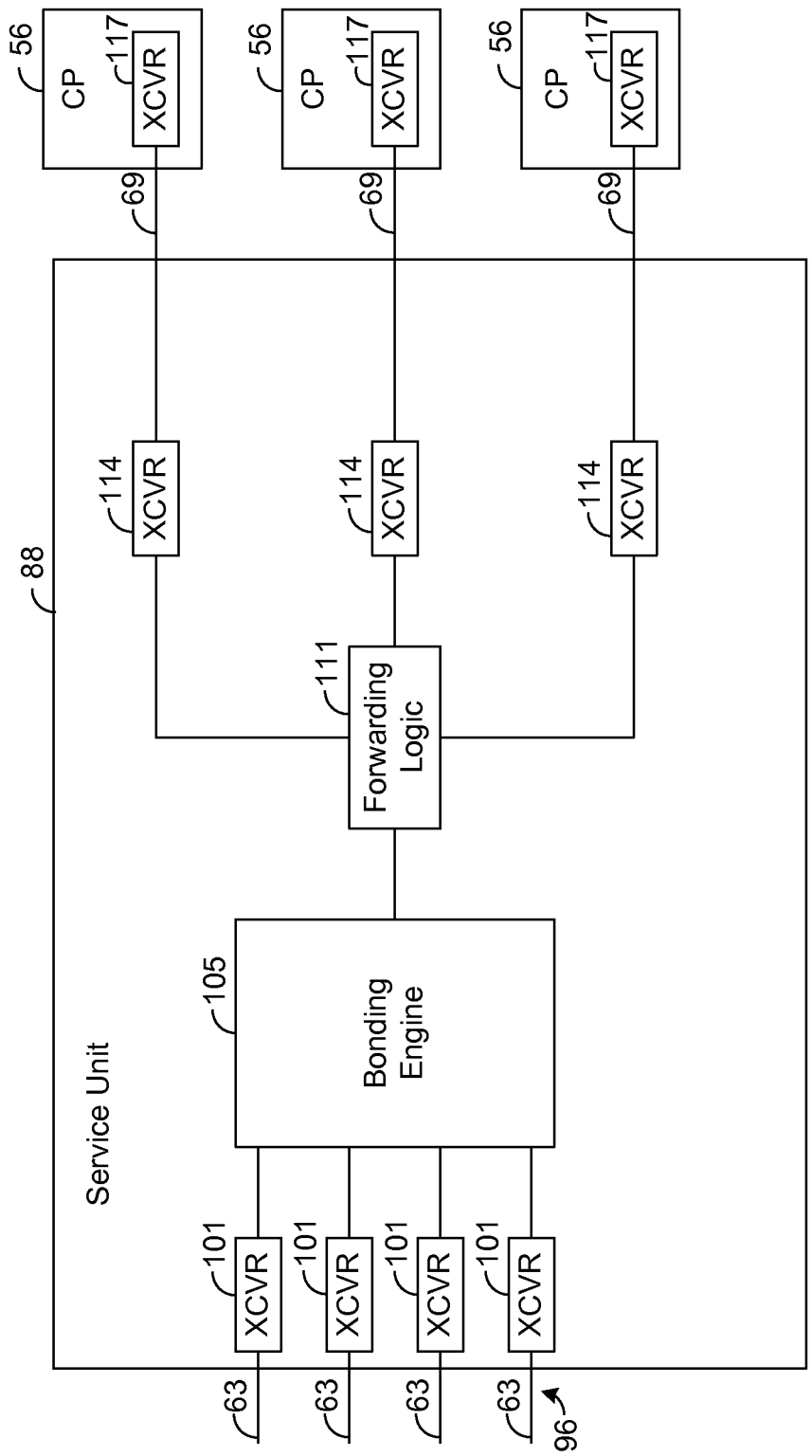
FIG. 5 is a block diagram illustrating an exemplary embodiment of a service unit, such as is depicted by FIG. 4.

FIG. 5 depicts an exemplary embodiment of a service unit 88 coupled to one bonding group 96. The service units 88 for the other bonding groups 97 and 98 may be configured similar to or identical to the service unit 88 depicted by FIG. 5. As shown by FIG. 5, the service unit 88 has a plurality of transceivers 101 respectively coupled to the connections 63 of the bonding group 96. Each transceiver 101 has termination circuitry, which includes active components, for terminating the connection 63 coupled to it. Further, each transceiver 101 demodulates the signal received from its respective connection 63 to recover the data fragments transmitted across such connection 63. The data fragments are transmitted to a bonding engine 105 that assembles the fragments and recovers the high-speed data stream originally fragmented by the bonding engine 92 (FIG. 4) at the access multiplexer 79. The bonding engine 105 transmits the recovered high-speed data stream to forwarding logic 111 that is coupled to a plurality of transceivers 114.

As shown by FIG. 5, each transceiver 114 is coupled to a respective CP transceiver 117 via at least one connection 69, and each transceiver 114 has termination circuitry, which includes active components, for terminating the connection 69 coupled to it. The forwarding logic 111 is configured to forward the data packets of the high-speed data stream to the transceivers 114 based on the destination addresses in the data packets such that each data packet is ultimately received by the CP transceiver 117 identified by the packet's destination address.

The exemplary embodiment depicted by FIG. 5 has three transceivers 114 respectively coupled to three CP transceivers 117 at three different customer premises 56. However, any number of transceivers 114, connections 69, CP transceivers 117, and customer premises 56 are possible in other embodiments. For example, it is possible for more than one connection 69 to be coupled between a transceiver 114 of the service unit 88 and a CP transceiver 117. Further, any customer premises 56 may have more than one CP transceiver 117.

By terminating the connections 63 and 69 at the DP 66, as described above, the wiring at the customer premises 117 is isolated from the connections 63. Thus, any reflections caused by such CP wiring should not affect the communication occurring over the bonded group 96, and such termination may allow more flexibility on modulation formats for the bonded group 96. In addition, it is possible to employ signal processing techniques, such as crosstalk vectoring, to reduce crosstalk interference affecting the signals transmitted across the connections 63, as will be described in more detail hereafter.

Figure 6:
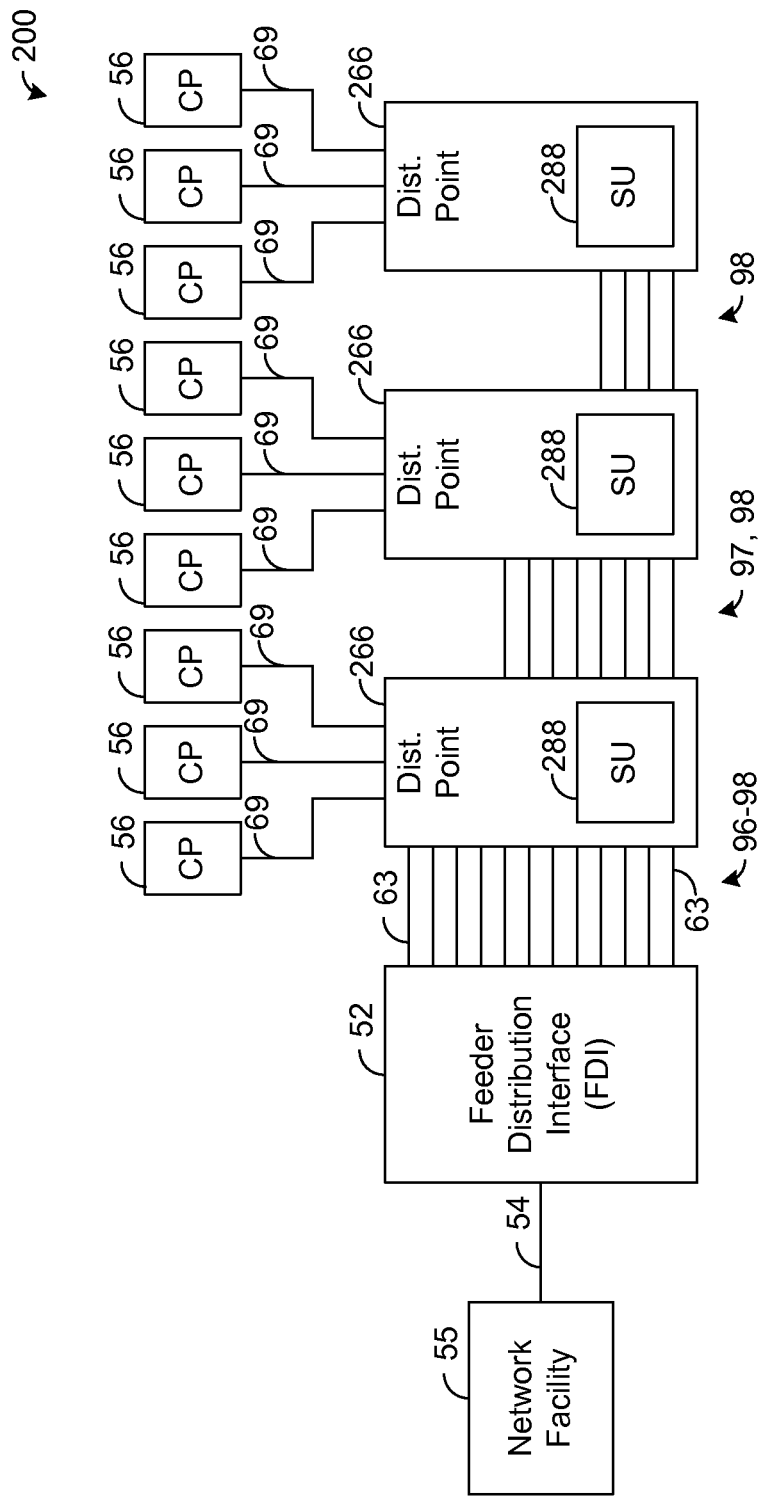
FIG. 6 is a block diagram illustrating an exemplary embodiment of a service unit, such as is depicted by FIG. 5.

When there is extended distance between the DPs 66, active transmission from DP-to-DP can boost the rate of the bonded channel. FIG. 6 shows an exemplary embodiment of a communication system 200 having a plurality of DPs 266 for servicing a plurality of customer premises 56, similar to the embodiment depicted by FIG. 2. However, the DPs 266 are arranged for active communication from DP-to-DP.

Figure 7:
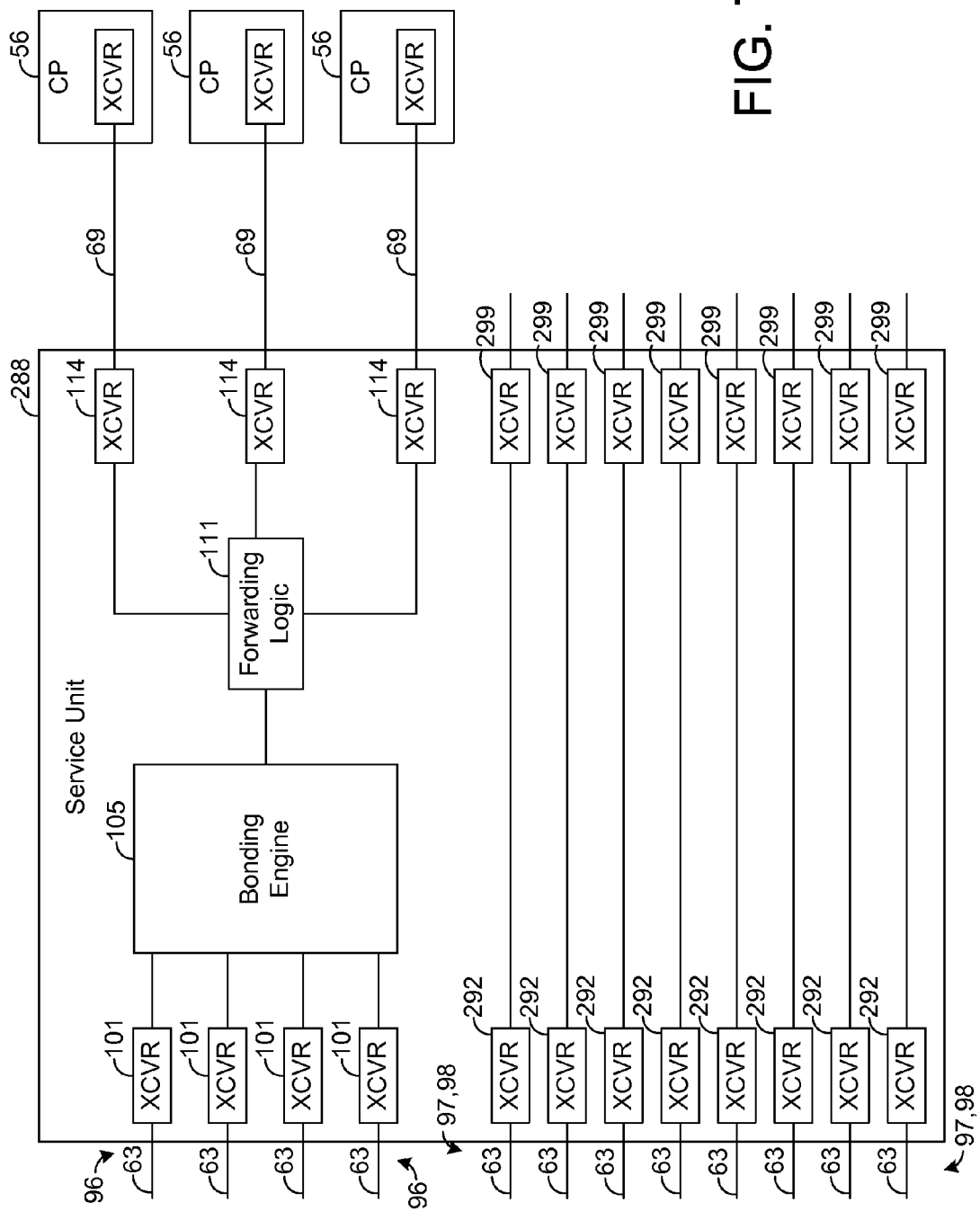
FIG. 7 is a block diagram illustrating an exemplary embodiment of a communication system in accordance with the present disclosure.

Each service unit 288 is coupled to at least one bonding group 96-98 and provides the data from one of the bonding groups 96-98 to at least one customer premises 56. As an example, FIG. 7 shows the service unit 288 for the DP 266 that is coupled directly to the FDI 52 and, thus, to each of the bonding groups 96-98. As shown by FIG. 7, the bonding engine 105 of the service unit 288 is configured to reassemble the fragments carried by the bonding group 96 and to recover the high-speed data stream originally fragmented at the FDI 52 (FIG. 6) and transmitted over the bonding group 96. Further, the forwarding logic 111 forwards the data packets of this high-speed data stream to the customer premises 56, as appropriate. Thus, the data carried by the bonding group 96 is provided to the customer premises 56 in the same way as described above for FIG. 2.

The DP 266 shown by FIG. 7 has a plurality of transceivers 292, which are each coupled to a respective connection 63 of the bonding groups 97 and 98. Each transceiver 292 is configured to demodulate the data signal received from the FDI 52 in order to recover the digital data carried by such signal. The transceiver 252 then transmits the digital data to another transceiver 299, which modulates a carrier signal with the digital data to form a data signal, which is a regeneration of the data signal received by the transceiver 292. This regenerated signal is transmitted downstream to the service unit 288 of the next DP 266. Thus, the service unit 288 shown by FIG. 7 serves as a repeater for the signals carried by the bonding groups 97 and 98.

The next DP 266 that receives the regenerated signals downstream is similarly configured to provide data from the bonding group 97 to a plurality of customer premises 56 and to regenerate the data signals carried by the bonding group 98. Using DPs 266 as repeaters helps to keep the length of the bonded channels short thereby helping to provide higher data rates through such channels. Note that it is not necessary for any DP 266 to provide a regenerated signal for the data signals passing through it. For example, rather than demodulating a received data signal and then using the data from the received signal to modulate a new carrier signal, a DP 266 may have amplifiers (not shown) that amplify the received signal for transmission to the next DP 266.

Figure 8:
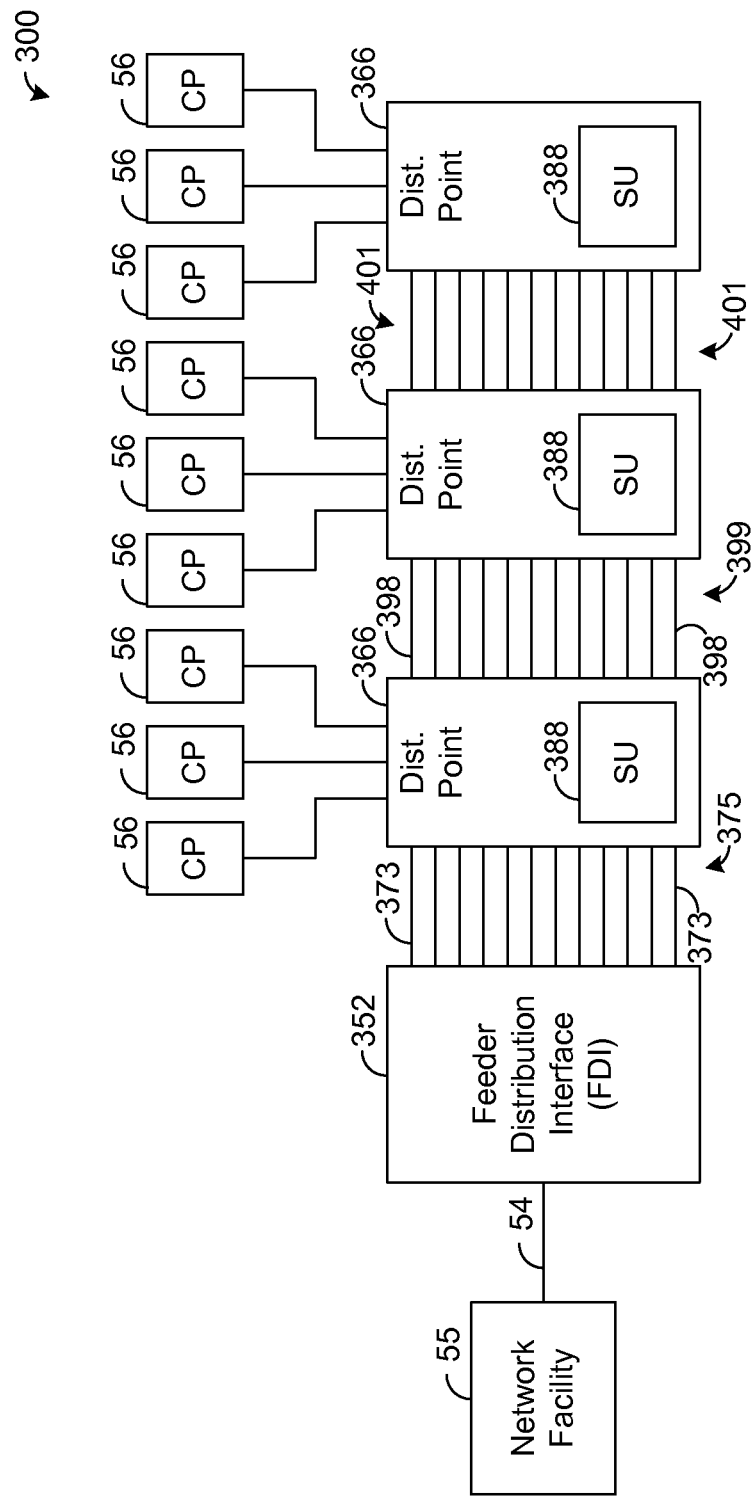
FIG. 8 is a block diagram illustrating an exemplary embodiment of a communication system in accordance with the present disclosure.

In one exemplary embodiment, when there is active communication from DP-to-DP, the data for multiple DPs share the same bonded channel in an effort to provide even greater peak rates for at least some subscribers. FIG. 8 depicts an exemplary embodiment of a communication system 300 in which data for multiple DPs share the same bonded channel. The communication system 300 has an FDI 352 and a plurality of DPs 366 for servicing a plurality of customer premises 56, similar to the embodiment depicted by FIG. 2. However, the DPs 366 are arranged for active communication from DP-to-DP.

Further, a plurality of communication connections 373 forming a single bonding group 375 extend from the FDI 352 to a DP 366, as shown by FIG. 8. As will be described in more detail below, this bonding group 375 carries data for each of the DPs 366.

Figure 9:
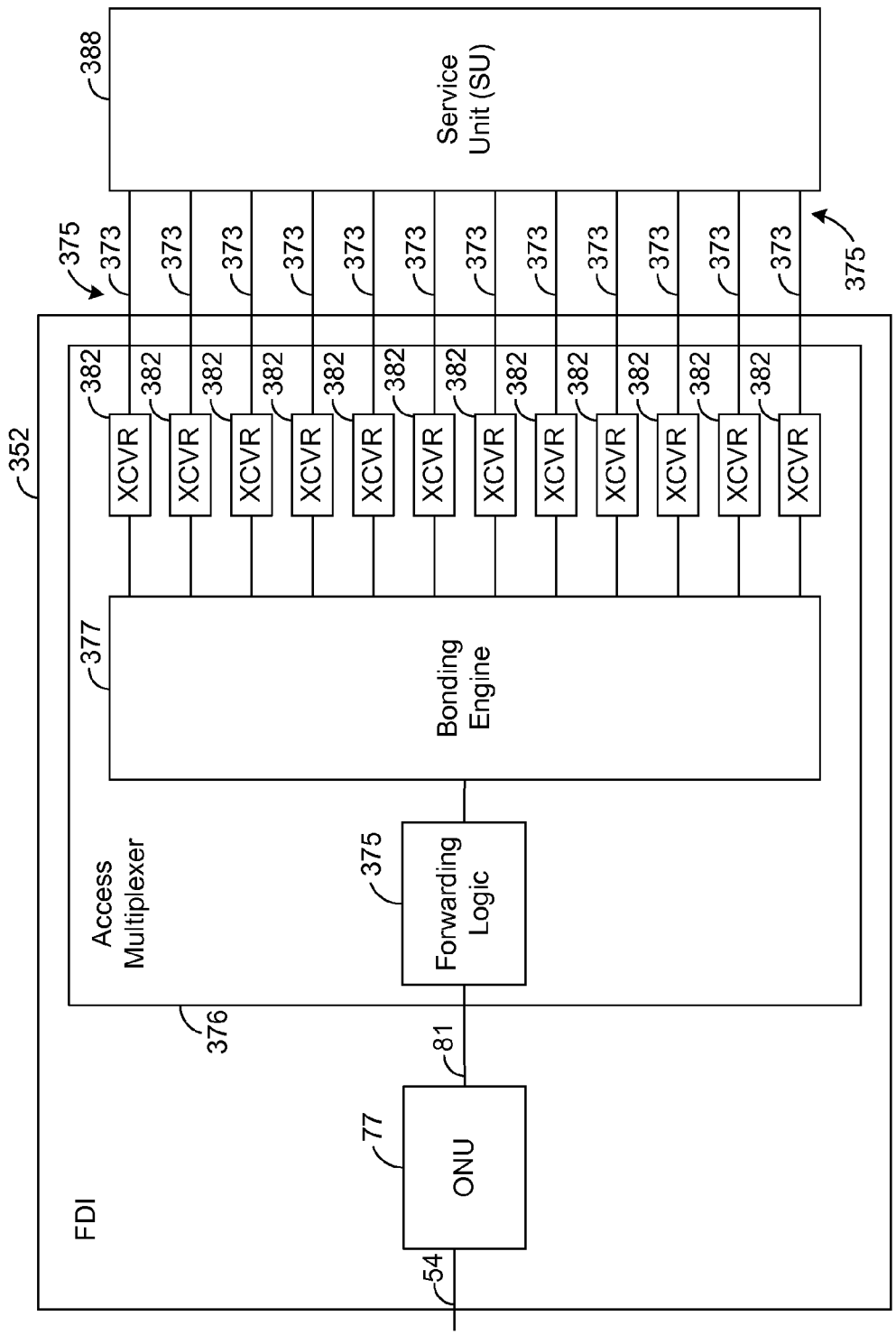
FIG. 9 is a block diagram illustrating an exemplary embodiment of a feeder distribution interface, such as is depicted by FIG. 8.

FIG. 9 shows an exemplary embodiment of the FDI 352 shown by FIG. 8. Forwarding logic 375 of an access multiplexer 376 receives the high-speed data stream transmitted from the ONU 77 and forwards packets of the high-speed data stream to a bonding engine 377. The bonding engine 377 is configured to fragment the data packets of this high-speed stream and distribute the fragments to a plurality of transceivers 382, which transmit the fragments across a plurality of communication connections 373, such as twisted-wire pairs. The embodiment of FIG. 7 is similar to that shown by FIG. 4, which forms three bonding groups 96-98, except that a single bonding group 375 is used to carry the fragments for multiple DPs 266. Note that the access multiplexer 376 may have transceivers and/or other bonding engines not shown by FIG. 9 to which the forwarding logic 375 may forward data packets received from the ONU 377.

Figure 10:
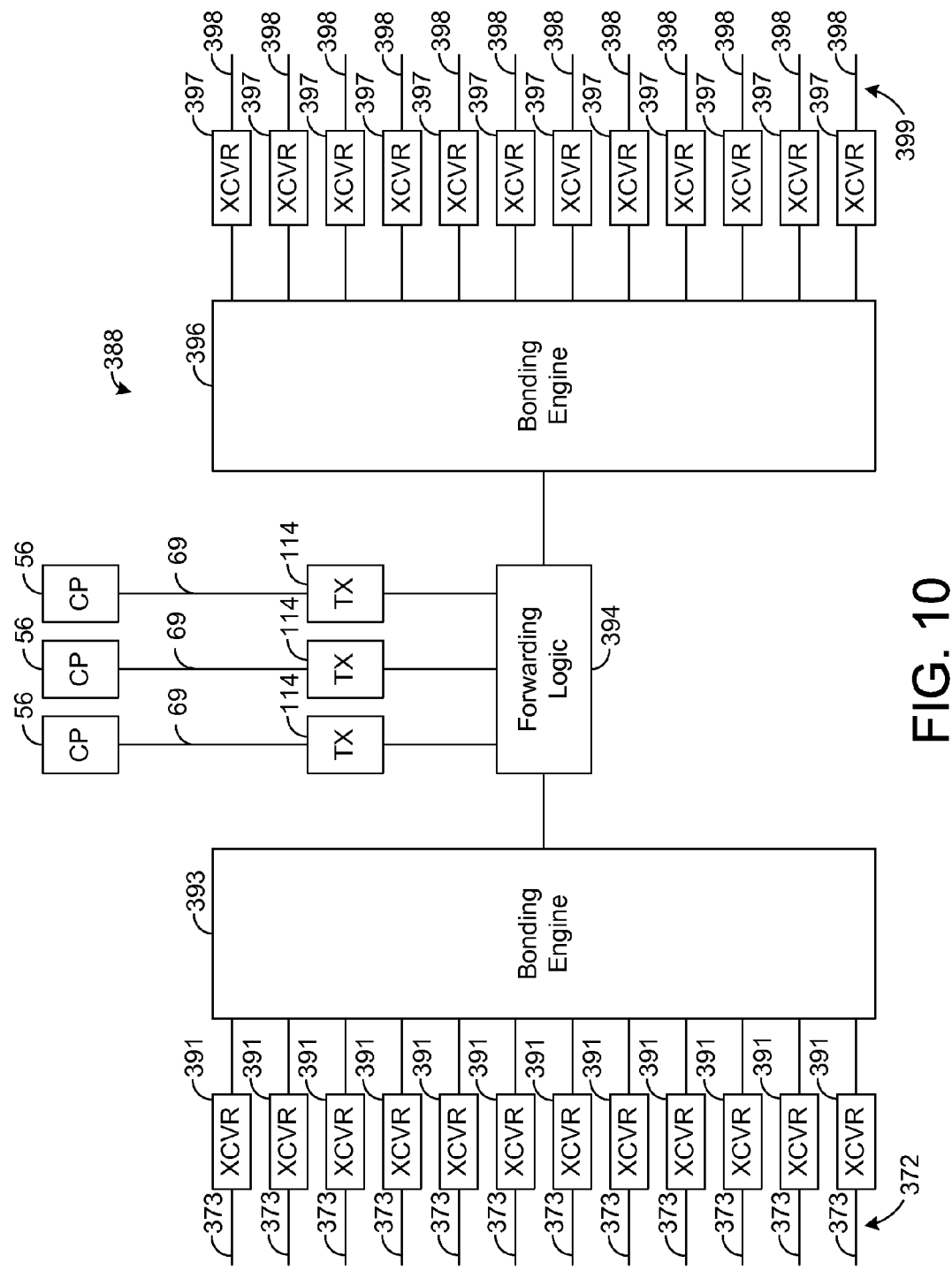
FIG. 10 is a block diagram illustrating an exemplary embodiment of a service unit, such as is depicted by FIG. 9.

FIG. 10 depicts an exemplary embodiment of the service unit 388 at the DP 366 that is coupled directly to the FDI 352. The service unit 388 has a plurality of transceivers 391. Each of the transceivers 391 is coupled to a respective one of the connections 373 of the bonding group 375 and demodulates the data signal received from such connection 373 to recover the fragments carried by the connection 373. A bonding engine 393 reassembles the fragments and recovers the high-speed data stream originally fragmented by the bonding engine 377 (FIG. 9).

Forwarding logic 394 is configured to receive this high-speed data stream and to forward the data packets in this stream based on their destination addresses. In this regard, data packets destined for the customer premises 56 shown by FIG. 10 and coupled directly to the service unit 388 by drop connections 69 are transmitted to transceivers 114, as appropriate, such that they arrive at their respective destinations. The other data packets, which are destined for customer premises 56 coupled directly to downstream DPs 366, are transmitted to a bonding engine 396. The bonding engine 396 is configured to fragment the received data packets and distribute the fragments to a plurality of transceivers 397, which transmit the fragments across a plurality of communication connections 398, such as twisted-wire pairs. Thus, the connections 398 form a bonding group 399 between the service unit 388 shown by FIG. 10 and the service unit 388 of the next downstream DP 366. Note that this next downstream service unit 388 may be configured similar to the one shown by FIG. 10 in order to provide a portion of the data carried by the bonding group 399 to customer premises 56 coupled directly to the downstream service unit 388 and to provide the remaining portion of such data to another DP 366 via a bonding group 401 (FIG. 8).

Accordingly, in the embodiment depicted by FIG. 8, a given bonded channel, such as a bonding group 375 or 399, may carry data for multiple DPs 366. Thus, the number of customers sharing the same bonded channel can be increased making it more likely that, at any given time, a greater number of CP transceivers 117 serviced by the same bonded channel will be inactive.

It should be noted that FIGS. 8-10 show the same number of communication connections within each bonding group 375, 399, and 401, but such a feature is unnecessary. For example, referring to FIG. 8, the bonding group 399 may have fewer connections 398 than the number of connections 373 in the bonding group 375. Further, it is possible for the bonding group 399 to have more connections 398 than the number of connections 373 in the bonding group 375. For example, a shorter distance or a different modulation format for the bonding group 375 relative to the bonding group 399 may allow the bonding group 375 to communicate more data across the same number or fewer connections 373 as the number of connections 398 in the bonding group 399. Moreover, any bonding group 375, 399, or 401 may have more or fewer connections than any of the other bonding groups.

Figure 11:
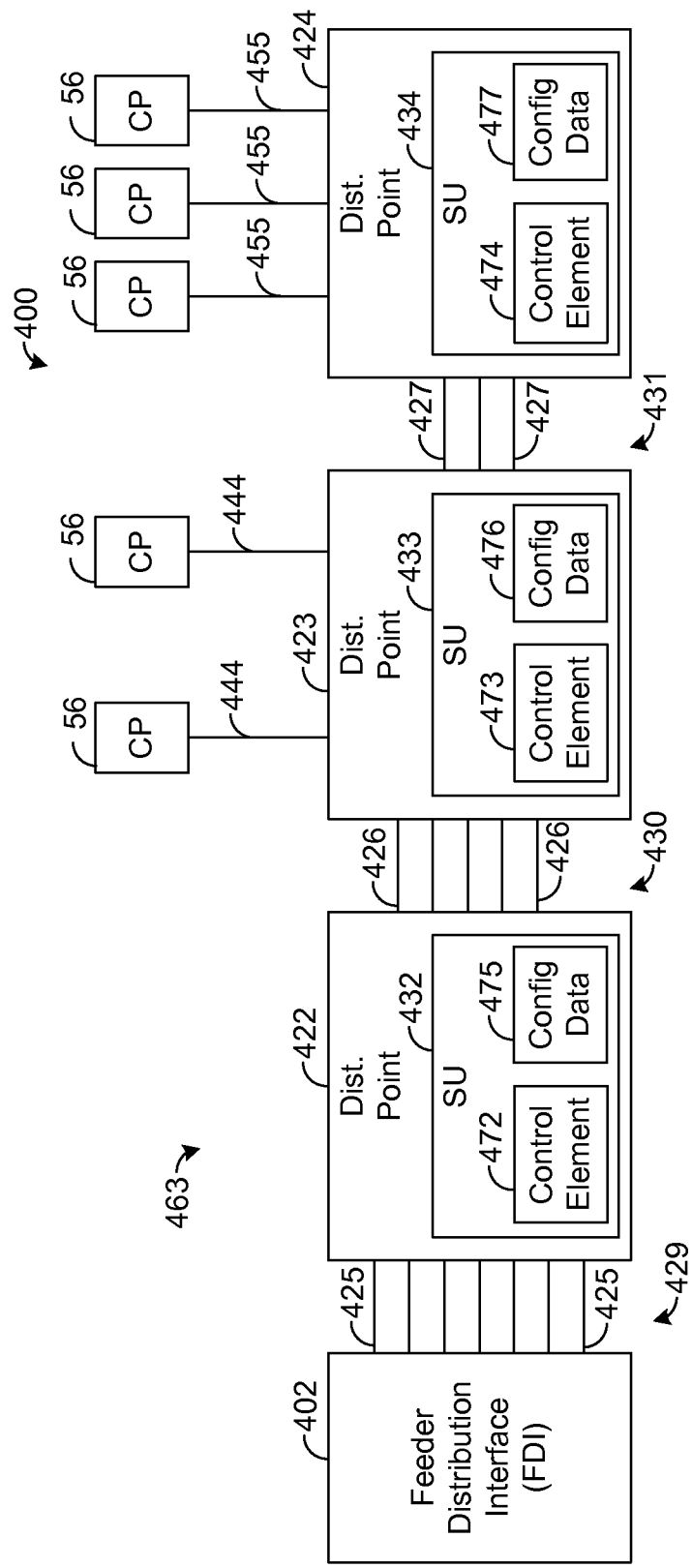
FIG. 11 is a block diagram illustrating an exemplary embodiment of a communication system in accordance with the present disclosure.

FIG. 11 depicts an exemplary embodiment of a communication system 400 having a plurality of DPs 422-424 for servicing a plurality of customer premises 56 where there is active communication from DP-to-DP, similar to the embodiment depicted by FIG. 8. As described above for FIG. 8, an FDI 402 communicates across a plurality of connections 425 forming a bonding group 429. Each connection 425 is coupled to a service unit 432 of the DP 422. Except as is otherwise described herein, the FDI 402 is configured similarly to and operates the same as the FDI 352 of FIG. 8.

The service unit 432 is coupled to a service unit 433 at the DP 423 via a plurality of connections 426 forming a bonding group 430. The service unit 433 is coupled to and communicates with equipment at one or more customer premises 56 via at least one drop connection 444. Further, the service unit 433 is coupled to a service unit 434 at the DP 424 via a plurality of connections 427 forming a bonding group 431. The service unit 434 is coupled to and communicates with equipment at one or more customer premises 56 via at least one drop connection 455.

As described above for the embodiment shown by FIG. 8, each bonding group 429-431 may have the same number of connections as the other bonding groups, or any bonding group may have a different number of connections relative to any other bonding group. In one exemplary embodiment, there are N connections 425 of the bonding group 429 and M connections 426 of the bonding group 430, where N is larger than M. Further, the service unit 432 functions as a repeater.

In a downstream direction, the service unit 432 receives data from the connections 425 and transmits such data across the connections 426. Since there are no drop connections for the DP 422, the aggregate data rate of the signals transmitted across the connections 426 should match the aggregate data rate of the signals received from the connections 425. Similarly, in the upstream direction, the aggregate data rate of the signals transmitted across the connections 425 should match the aggregate data rate of the signals received from the connections 426.

The connections 425-427 that extend between DPs 422-424 and/or the FDI 402 are collectively referred to as a "trunk" 463. In one exemplary embodiment, the same modulation format is used for each leg of the trunk. Unless otherwise specified herein, it will be assumed hereafter that VDSL (e.g., first generation VDSL or VDSL2) is used for the signals communicated in both the upstream and downstream directions across the connections 425-427. In other embodiments, other types of modulation formats may be used.

Since there is a greater number of connections 425 relative to the connections 426, the data rate of each respective connection 425 may be less than the data rate of each respective connection 426 while the aggregate data rates are equal. Such is useful when, for example, the DP 422 is located further from the FDI 402 than from the next downstream DP 423. As known in the art, signals are attenuated as they propagate across the connections 425-427. Using a lower data rate for each respective connection 425 allows a greater reach for the leg between the FDI 402 and the DP 422.

Further, in one exemplary embodiment, at least some data carried by the connections 426 is transmitted to the customer premises 56 by drop connections 444 thereby reducing the data requirements for the next downstream leg of the trunk 463. That is, since some of the data received from the connections 426 in the downstream direction is transmitted across the DP connections 444, less data needs to be transmitted across the connections 427 to the next downstream DP 424 relative to data transmitted across the connections 426 feeding the DP 423. Thus, in one exemplary embodiment, there are P connections 427, where P is less than M (i.e., the number of connections 426). Indeed, in one exemplary embodiment, P is equal to M−K, wherein K is the number of drop connections 444. However, other numbers of connections 427 are possible in other embodiments, and it is possible for P to exceed M and/or for M to exceed N.

As shown by FIG. 11, each service unit 432-434 has a respective control element 472-474 that is configured to control the service unit based on a respective set of configuration data 475-477. The control elements 472-474 will be described in more detail hereafter.

Note that the signals communicated by the system 400 are susceptible to crosstalk, which refers to energy that couples from one communication connection to another thereby interfering with the signals transmitted across the connection that receives the crosstalk. Crosstalk generally degrades the quality of signals communicated across connections that are positioned within a close proximity of one another, such as within the same binder, and the effects of crosstalk can be pronounced especially for high bandwidth signals, such as VDSL signals.

There are various types of crosstalk that can affect signals propagating along a connection. Far-end crosstalk (FEXT) generally refers to crosstalk that is received at one location but is induced by an interfering signal transmitted at a remote location (e.g., the far end of a binder through which the signal is transmitted). Near-end crosstalk (NEXT) generally refers to crosstalk that is received at one location and is induced by an interfering signal transmitted from the same location. As an example, when an interfering signal transmitted by the service unit 432 in the downstream direction across a connection 426 interferes with another signal transmitted by the service unit 432 across another connection 426 in the downstream direction, the resulting interference is referred to as FEXT. However, when an interfering signal transmitted by the service unit 432 in the downstream direction across a connection 426 interferes with a signal transmitted by the service unit 433 in the upstream direction across a connection 426, the resulting interference is referred to as NEXT, although NEXT does not generally exist in a system in which upstream and downstream signals are frequency division multiplexed.

In one exemplary embodiment, the connections 425 are located in the same binder (not shown), the connections 426 are located in another binder, and the connections 427 are located in yet another binder. Thus, the signals propagating along the connections 425-427 are affected by FEXT. Even if the connections of a given bonding group are not located in the same binder, the connections may be positioned close to one another at or within a service unit, such that the signals are nevertheless affected by FEXT. In VDSL, upstream signals and downstream signals are frequency division multiplexed. That is, the signals transmitted upstream are within one frequency range, and the signals transmitted downstream are in another frequency range that does not overlap with the frequency rage of the upstream signals. Thus, the signals communicated across the connections 425-427 should not be affected by NEXT.

The service units 432-434 and the FDI 402 are configured to perform vectoring in order to cancel crosstalk from the signals communicated across the trunk 463 and drop connections 444 and 455. Vectoring is a known technique by which signals are associated with coefficients, referred to as "vectoring coefficients," that are used to estimate crosstalk amounts, which can then be used to cancel crosstalk, as will be described in more detail below.

In a discrete multi-tone (DMT) system, such as VDSL or ADSL, each signal carries a plurality of tones in which each tone occupies a given frequency range that does not overlap with the frequency ranges of the other tones carried by the signal. In general, a given tone, referred to as "victim tone," of one signal can be affected by crosstalk from tones, referred to as "interfering tones," of other signals within the same frequency range as the victim tone. In order to cancel crosstalk from the victim tone, a set of vectoring coefficients is defined in which each coefficient is associated with a respective one of the interfering tones. Vectoring logic, sometimes referred to as a "vector engine," is configured to mathematically combine (e.g., multiply) the symbol of each interfering tone with its respective vectoring coefficient in order to estimate the amount of crosstalk induced by such symbol and affecting the symbol of the victim tone. The vector engine then mathematically combines (e.g., subtracts) the crosstalk estimate from the symbol of the victim tone in order to cancel the estimated crosstalk from the symbol of the victim tone. By performing such cancellation for each interfering tone affecting the victim tone, the vector engine effectively removes crosstalk from the symbol of the victim tone.

After such cancellation, the modified symbol of the victim tone is decoded to determine an error signal indicative of the error in the modified symbol. Such error signal is provided to the vector engine, which adaptively updates the vectoring coefficients using the least means square algorithm or some other known adaptive update algorithm so that the coefficients can be adapted for changing line conditions. Such vectoring techniques have conventionally been employed in order to remove FEXT from signals communicated in DSL systems. Similarly, the service units 432-434 are configured to employ vectoring in order to remove FEXT from the signals communicated across the connections 425-427 of the system 400.

However, in the system 400 depicted by FIG. 11, the signals are affected by another type of crosstalk, referred to herein as "crossover crosstalk" (COXT). COXT generally refers to crosstalk that couples from one side of a service unit to another. As an example, in the context of the service unit 432, the connections 425 are not in the same binder as the connections 426. However, the ends of the connections 425 may be located close to the ends of the connections 426 at or inside of the service unit 432 such that COXT couples from the connections 425 to the connections 426 and vice versa. That is, a signal propagating along a connection 425 may interfere with a signal propagating in the same direction along a connection 426, and a signal propagating along a connection 426 may interfere with a signal propagating in the same direction along a connection 425.

Notably, COXT is dissimilar to FEXT that is cancelled by conventional vectoring techniques. In particular, COXT is more similar to NEXT in that COXT originates from signals transmitted by a service unit and affects the signals received by this same service unit. That is, the interfering tones are transmitted by a service unit, and the victim tones affected by such interfering tones are received by this same service unit. However, NEXT is typically associated with signals that are transmitted within the same binder or a set of binders on the same side of a service unit where the interfering tones travel in a different direction relative to the victim tone. COXT on the other hand is associated with signals that are in different binders on different sides of a service unit and that travel in the same direction. For example, COXT affecting a victim tone transmitted by the service unit 432 across a connection 426 in the downstream direction may be induced by an interfering tone transmitted in the same downstream direction to the service unit 432 across a connection 425 in a different binder. In such an example, the interfering tones and the victim tone travel in the same direction but in different binders.

In one exemplary embodiment, the service units 432 and 433 are both configured to employ vectoring in order to cancel COXT. Exemplary techniques for employing vectoring in order to cancel COXT are described in commonly-assigned U.S. patent application Ser. No. 13/016,680, entitled "Systems and Methods for Cancelling Crosstalk in Satellite Access Devices" and filed on Jan. 28, 2011, which is incorporated herein by reference.

Figure 12:
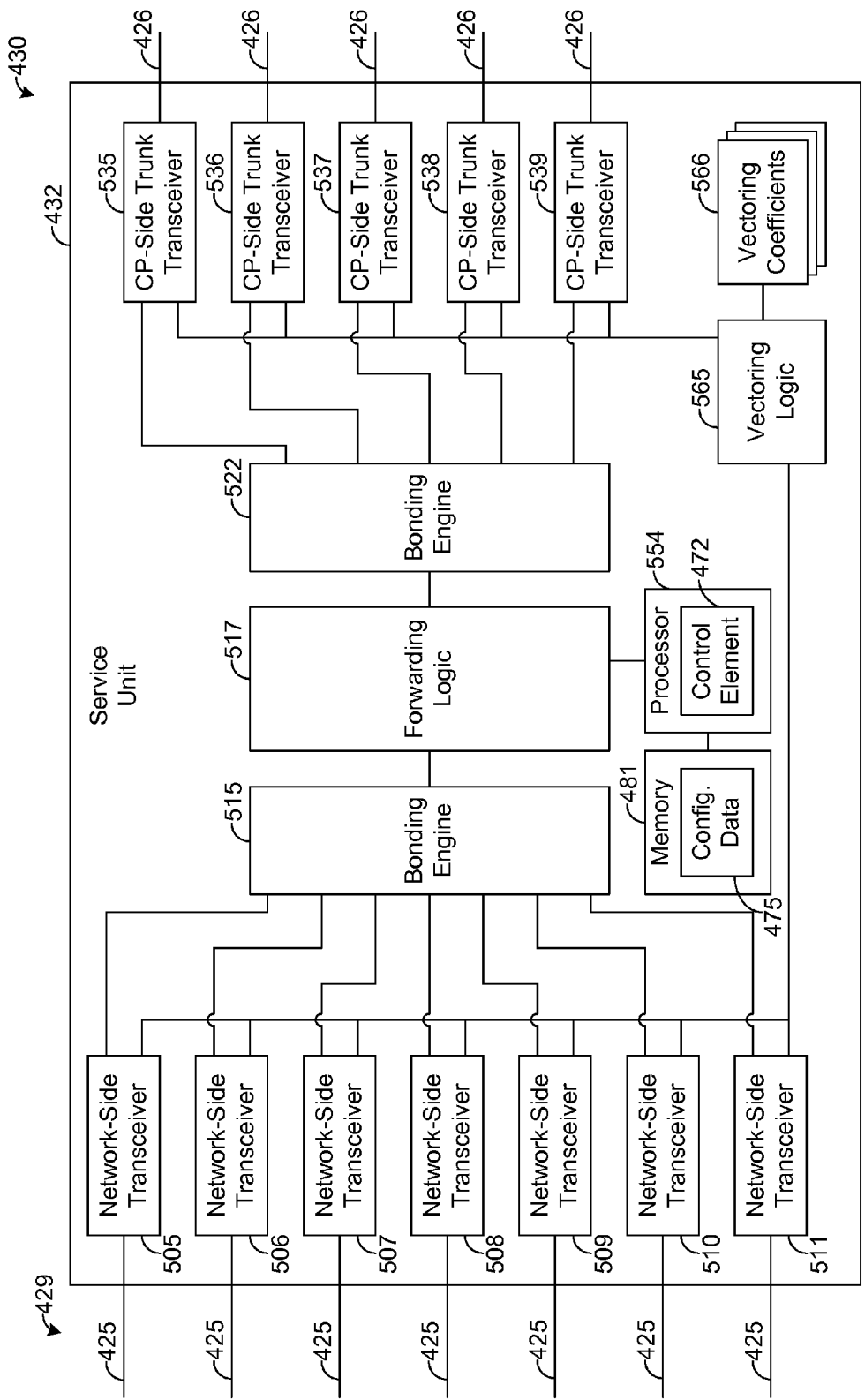
FIG. 12 is a block diagram illustrating an exemplary embodiment of a service unit, such as is depicted by FIG. 11.

FIG. 12 depicts an exemplary embodiment of the service unit 432 at the DP 422. The service unit 432 is similar to the embodiment depicted by FIG. 10 except that the service unit 432 is configured to perform crosstalk vectoring as will be described in more detail hereafter.

In this regard, the service unit 432 has a plurality of transceivers 505-511 respectively coupled to the connections 425 of the bonding group 429. For clarity purposes, each of the transceivers 505-511 shall be referred herein as a "network-side transceiver." Each network-side transceiver 505-511 is coupled to a bonding engine 515, which is coupled to forwarding logic 517. The forwarding logic 517 is coupled to a bonding engine 522, which is coupled to a plurality of transceivers 535-539. For clarity purposes, each transceiver 535-539 shall be referred to as a "CP-side trunk transceiver." Each CP-side trunk transceiver 535-539 is coupled to a respective connection 426 of the bonding group 430. For illustrative purposes, it will be assumed hereafter that each transceiver 505-511 and 535-539 employs VDSL, but it should be emphasized that other modulation formats may be used in other embodiments.

In the downstream direction, each transceiver 505-511 receives and demodulates a respective VDSL signal to recover fragments, which are reassembled to by the bonding engine 515 to recover the data stream originally fragmented by a bonding engine of the FDI 402 (FIG. 11). The forwarding logic 517 receives the data stream and forwards the packets of the data stream to the bonding engine 522. The bonding engine 522 fragments each packet into a plurality of fragments, and each fragment is used by a respective transceiver 535-539 to modulate a carrier signal for transmission across the respective connection 426 coupled to such transceiver.

As shown by FIG. 12, the service unit 432 has a control element 472 for controlling operation of the service unit 432 based on configuration data 475 stored in memory 481. In the exemplary embodiment shown by FIG. 12, the control element 472 is implemented in software, stored within memory of a processor 554, and executed by the processor 554. In other embodiments, the control element 472 can be stored in and/or executed by other types of instruction execution devices. Further, the control element 472 can be implemented in hardware, software, firmware, or any combination thereof. The exemplary processor 554 shown by FIG. 12 is configured to handle exception packets and control packets. In this regard, when the forwarding logic 517 receives such a packet, the forwarding logic 517 traps the packet such that it is transmitted to the processor 554 rather than being forwarded to one of the bonding engines 515 or 522. In this regard, in one exemplary embodiment, there is an embedded control channel provided by the trunk 463 so that the service units 422-424 can communicate control packets to one another via the connections 426 and 427. Other techniques for communicating control information among the service units 422-424 are possible in other embodiments.

As shown by FIG. 12, the service unit 432 also has vectoring logic 565 for performing crosstalk vectoring in order to cancel crosstalk from the signals communicated across the connections 425 and 426 based on sets of vectoring coefficients 566, as will be described in more detail below. The vectoring logic 565 is coupled to each transceiver 505-511 and 535-539 of the service unit 432 as shown by FIG. 12.

In one exemplary embodiment, the vectoring logic 565 uses sets of vectoring coefficients 566 to cancel FEXT that couples from one connection 426 to another. In this regard, each tone communicated by or with a respective one of the CP-side trunk transceivers 535-539 corresponds to a set of coefficients 566, and the vectoring logic 565 uses the corresponding coefficient set to cancel FEXT tone-by-tone induced by other interfering tones communicated by or with the CP-side trunk transceivers 535-539. The set of coefficients 566 corresponding to a communicated tone includes coefficients respectively associated with the interfering tones communicated across the connections 426.

As an example, assume that a set of coefficients 566 corresponds to an upstream tone, referred to hereafter as "victim tone" for this example, received by the CP-side trunk transceiver 535 from one of the connections 426, which is referred to as the "victim connection" for this example. The foregoing coefficient set includes coefficients respectively associated with the upstream tones, referred to as "upstream interfering tones," communicated across the other connections 426 that interfere with the victim tone.

In particular, for a given symbol of the victim tone, the vectoring logic 565 receives such symbol from the CP-side trunk transceiver 535, and the vectoring logic 565 receives from the other CP-side trunk transceivers 536-539 the symbols of each of the upstream interfering tones communicated across the connections 426 at the same time as the received symbol of the victim tone. The vectoring logic 565 then combines each upstream interfering tone with the coefficient respectively associated with such interfering tone to determine an amount ("crosstalk contribution") that the interfering tone affects the symbol of the victim tone. The vectoring logic 565 then digitally combines (e.g., subtracts) the determined crosstalk contribution with the symbol of the victim tone to cancel the crosstalk induced by the interfering tone. Such cancellation is performed tone-by-tone for each upstream interfering tone such that the symbol of the victim tone filtered by the vectoring logic 565 is substantially free of the crosstalk induced by the upstream interfering tones.

After canceling crosstalk from the symbol of the victim tone, such symbol is transmitted back to the CP-side trunk transceiver 535, which then decodes the symbol and determines an error associated with the symbol. The transceiver 535 transmits an error signal indicative of such error to the vectoring logic 565, which then adaptively updates the set of coefficients 566 corresponding to the victim tone via the least means square (LMS) algorithm or some other known coefficient update algorithm. Similar techniques are used to cancel FEXT from each tone received by a respective one of the CP-side trunk transceivers 535-539. Accordingly, for each upstream symbol received by the CP-side trunk transceivers 535-539, FEXT induced by the upstream signals propagating along the connections 426 is canceled by the vectoring logic 565.

Similar vectoring techniques are used to cancel FEXT from downstream tones transmitted by the CP-side trunk transceivers 535-539 across the connections 426. In this regard, prior to transmission across the connections 426, each CP-side trunk transceiver 535-539 transmits to the vectoring logic 565 the symbol of each downstream tone to be transmitted simultaneously across the connections 426. The vectoring logic 565 then precodes the symbols such that FEXT that couples from one connection 426 to another is canceled as the symbols propagate along the connections 426.

In this regard, assume that the CP-side trunk transceiver 535 is to transmit a symbol of a downstream tone, referred to as the "'victim tone" in this example, across the connection 426 coupled to it. For each interfering tone that will affect the symbol of the victim tone during transmission via the bonding group 430, the vectoring logic 565 receives the symbol of the interfering tone to be transmitted simultaneously with the symbol of the victim tone across the connections 426 and combines such symbol with its associated vectoring coefficient to form a precoded victim tone symbol which has compensated for the crosstalk induced by the symbols of the interfering tones. The symbol of each victim tone is similarly precoded for each interfering tone such that the symbols received by the service unit 433 (FIG. 11) of the DP 423 substantially free of FEXT. The service unit 433 decodes the symbol of the victim tone and generates an error signal indicative of the error in such symbol, and the service unit 433 transmits the error signal to the service unit 432 allowing the vectoring logic 565 to update the set of coefficients 566 corresponding to the victim tone. Accordingly, the vectoring logic 565 is configured to cancel FEXT in both the upstream and downstream signals transmitted across the connections 426.

Figure 13:
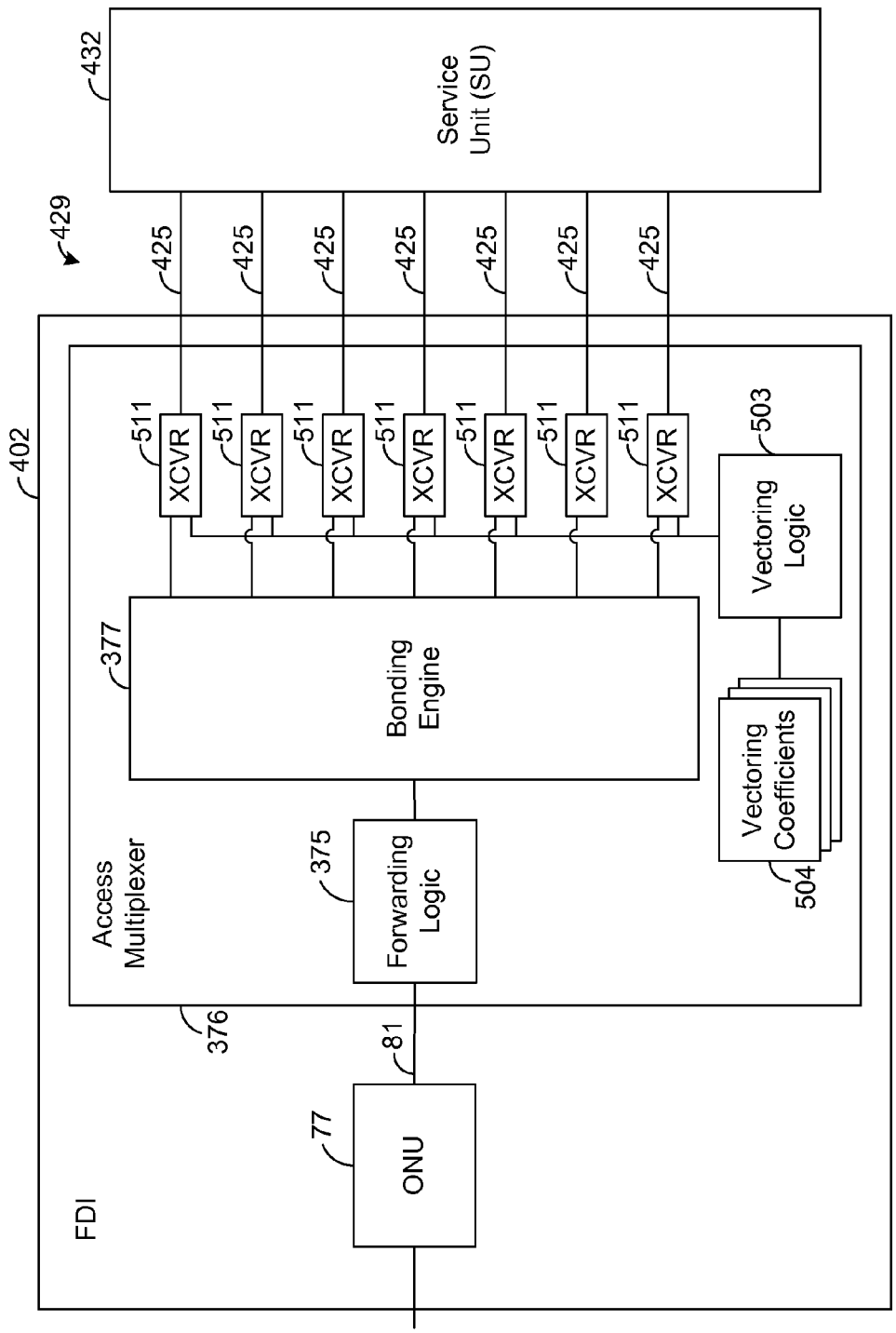
FIG. 13 is a block diagram illustrating an exemplary embodiment of a feeder distribution interface, such as is depicted by FIG. 11.

As shown by FIG. 13, the FDI 402 is configured similar to the FDI 352 of FIG. 9 except that the FDI 402 has vectoring logic 503 that uses sets of vectoring coefficients 504 to cancel FEXT from the signals carried by the connections 425. In this regard, the FDI 402 has a plurality of transceivers 511 that are respectively coupled to the connections 425, and the vectoring logic 503 is coupled to each of the transceivers 511. The vectoring logic 503 is configured to utilize the sets of coefficients 504 to cancel FEXT in the upstream and downstream signals communicated across the connections 425 in the same way that the vectoring logic 565 (FIG. 12) is described above as using the sets of coefficients 566 to cancel FEXT from the signals communicated across the connections 426. In particular, the vectoring logic 503 receives the symbols of the upstream signals and cancels FEXT from such symbols. The vectoring logic 503 also precodes the symbols of the downstream signals so that FEXT that couples from connection-to-connection is canceled as the downstream signals propagate along the connections 425.

As shown by FIG. 12, the vectoring logic 565 is also coupled to and communicates with each of the network-side transceivers 505-511. The vectoring logic 565 is configured to receive each symbol of each tone transmitted by the network-side transceivers 505-511 across the connections 425. Since these upstream tones are in the same frequency range as the upstream tones received by the CP-side trunk transceivers 535-539 from the connections 426, COXT couples from the connections 425 to the connections 426 and vice versa. The vectoring logic 565 is configured to use the upstream symbols transmitted by the network-side transceivers 505-511 to cancel the COXT that couples from the connections 425 to the connections 426.

In this regard, consider the example described above in which the vectoring logic 565 is canceling FEXT from a victim tone received by the CP-side trunk transceiver 535 from the connection 426 coupled to it. A set of vectoring coefficients 566 corresponding to the victim tone includes coefficients associated with the upstream interfering tones transmitted across the connections 425 by the network-side transceivers 505-511. The vectoring logic 565 is configured to combine (e.g., multiply) the respective symbol of each upstream interfering tone transmitted across the connections 425 with its associated vectoring coefficient to determine a respective crosstalk contribution that is combined with (e.g., subtracted from) the symbol of the victim tone to cancel the COXT induced by the upstream interfering tone.

As an example, assume that an upstream tone (referred to in this example as the "upstream interfering tone") transmitted by the network-side transceiver 505 across the connection 425 coupled to it. Also assume that such upstream interfering tone is associated with a vectoring coefficient (b) in a set of vectoring coefficients 566 corresponding to the victim tone. In such example, the network-side transceiver 505 transmits the symbol of the upstream interfering tone to the vectoring logic 565. The vectoring logic 565 combines such symbol from the transceiver 505 with coefficient b to determine a crosstalk contribution indicative of an estimated amount of COXT induced by the upstream interfering tone and affecting the symbol of the victim tone. The vectoring logic 565 combines such crosstalk contribution with the symbol of the victim tone to cancel the COXT induced by the upstream interfering tone. Once each symbol of the interfering tones transmitted by the network side transceivers 505-511 (for canceling COXT) and the other trunk transceivers 536-539 (for canceling FEXT) has been combined with the symbol of the victim tone, the symbol of the victim tone is transmitted to the transceiver 535, which decodes the symbol and provides an error signal as indicated above. The vectoring coefficients used to estimate the crosstalk affecting the victim tone are then adaptively updated based on the error signal.

Accordingly, for the victim tone received by the CP-side trunk transceiver 535, FEXT from upstream interfering tones carried by the connections 426 and COXT from upstream interfering tones carried by the connections 425 are both canceled thereby improving the quality of the victim tone. In a similar manner, the vectoring logic 565 is configured to cancel crosstalk in each upstream tone received by the CP-side trunk transceivers 535-539 from the connections 426.

Similarly, the vectoring logic 565 is configured to use the downstream symbols transmitted by the trunk transceivers 535-539 to cancel the COXT that couples from the connections 426 to the connections 425. In this regard, consider an example in which the network-side transceiver 505 receives a downstream tone, referred to as "victim tone" in this example, affected by COXT that couples from downstream tones, referred to as "downstream interfering tones" in this example, transmitted across the connections 426. A set of vectoring coefficients 566 corresponding to the victim tone includes coefficients associated with the downstream interfering tones transmitted across the connections 426 by the CP-side trunk transceivers 535-539. The vectoring logic 565 is configured to combine (e.g., multiply) the respective symbol of each downstream interfering tone transmitted across the connections 426 with its associated vectoring coefficient to determine a respective crosstalk contribution that is combined with (e.g., subtracted from) the symbol of the victim tone to cancel the COXT induced by the downstream interfering tone. Thus, the vectoring logic 565 is configured to cancel COXT that couples in both directions between the connections 425 and 426.

Figure 14:
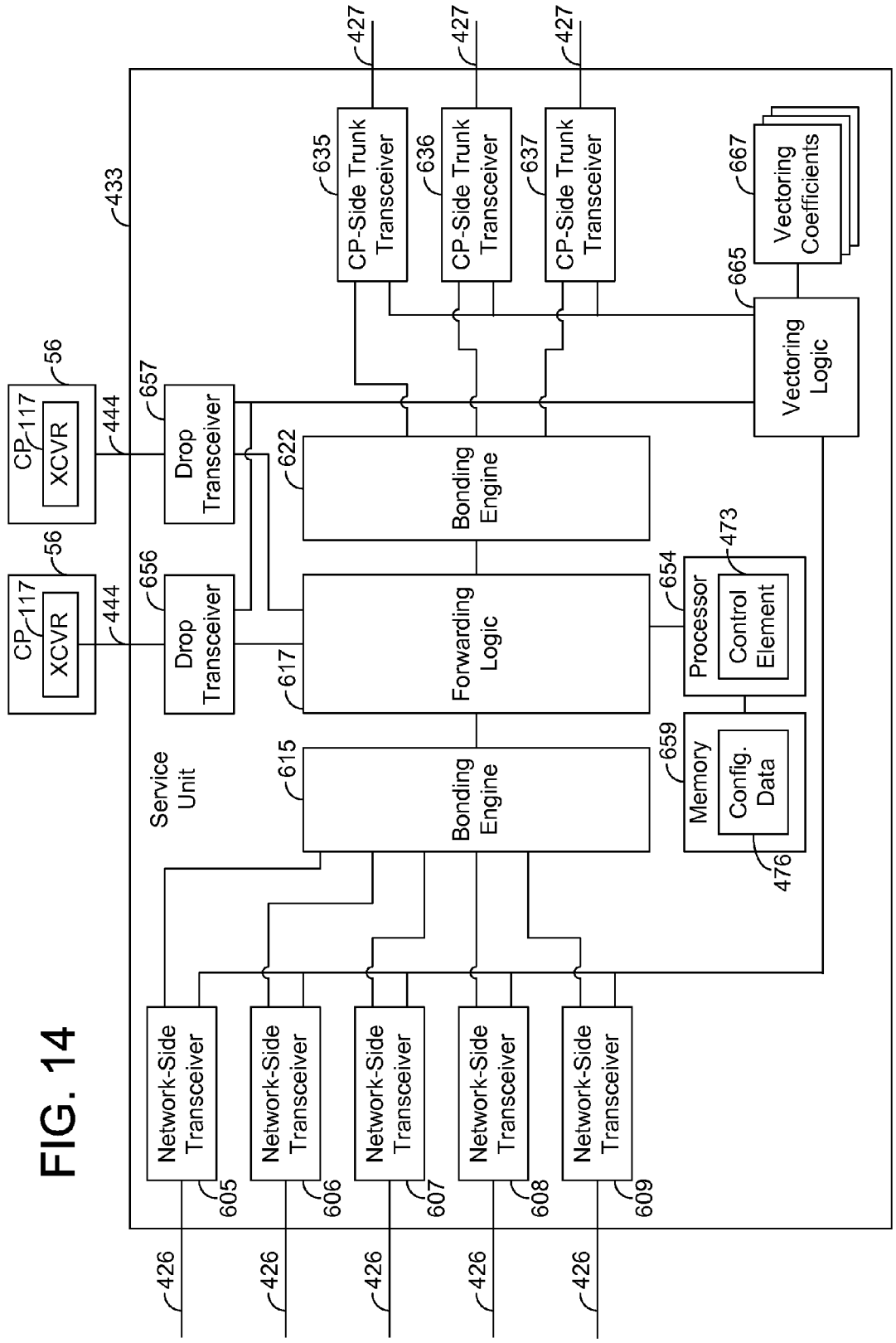
FIG. 14 is a block diagram illustrating an exemplary embodiment of a service unit, such as is depicted by FIG. 11.

Referring again to FIG. 11, the service unit 433 at the DP 423 is configured to cancel FEXT and COXT according to techniques similar to those described above for the service unit 432 of FIG. 12. FIG. 14 depicts an exemplary embodiment of the service unit 433. As shown by FIG. 14, the service unit 433 comprises a plurality of network-side transceivers 605-609, bonding engines 615 and 622, forwarding logic 617, and a plurality of CP-side trunk transceivers 635-637. The service unit 433 also comprises a plurality of transceivers 656 and 657, referred to hereafter as "drop transceivers," that are respectively coupled to CP transceivers 117 via drop connections 444. The service unit 433 further comprises a control element 473 that is configured to control operation of the service unit 433 based on configuration data 476 stored in memory 659. In one embodiment, the control element 473 is implemented in software and stored in, as well as executed by, a processor 654, similar to the control element 472 of FIG. 12. However, in other embodiments, the control element 473 can be stored in and/or executed by other types of devices, and the control element 473 can be implemented in hardware, software, firmware, or any combination thereof.

In the downstream direction, the bonding engine 615 reassembles fragments from the connections 427 to recover the data stream originally fragmented by the bonding engine 522 (FIG. 12) of the service unit 432, and the forwarding logic 617 forwards each packet. In the exemplary embodiment shown by FIG. 14, a packet can be forwarded to a respective one of the drop transceivers 656 or 657 or to the bonding engine 622 depending on the packet's destination. Each packet received by the bonding engine 622 is fragmented for transmission across the connections 427.

In the upstream direction, the bonding engine 622 reassembles fragments from the connection 427 to recover the data stream originally fragmented by the service unit 434 (FIG. 11). The forwarding logic 617 transmits a data stream, which includes packets from the bonding engine 622 and packets from the drop transceivers 656 and 657, to the bonding engine 615, and the bonding engine 615 fragments such packets for transmission across the connections 426.

The service unit 433 also comprises vectoring logic 665 that is configured to cancel crosstalk using sets of vectoring coefficients 667, similar to the vectoring logic 565 of FIG. 12. In particular, the vectoring logic 665 cancels FEXT affecting the signals communicated across the connections 427 using the same techniques described above for the vectoring logic 565 to cancel FEXT affecting the signals communicated across the connections 426, including both FEXT that couples from one connection 427 to another and FEXT that couples from the drop connections 444 to the connections 427. The vectoring logic 665 also cancels COXT that couples between the connections 426 and 427 using the same techniques described above for the vectoring logic 565 (FIG. 12) to cancel COXT that couples between the connections 425 and 426.

The vectoring logic 665 further cancels FEXT affecting the signals communicated across the drop connections 444 using the same techniques described above for the vectoring logic 565 to cancel FEXT affecting the signals communicated across the connections 426, including both FEXT that couples from one drop connection 444 to another and FEXT that couples from the connections 427 to the drop connections 444. As described above, the vectoring logic 565 (FIG. 12) of the service unit 432 cancels FEXT affecting the signals communicated across the connections 426.

In addition, the vectoring logic 665 of the service unit 433 shown by FIG. 14 cancels COXT that couples between the drop connections 444 and the trunk connections 426 using the same techniques described above for the vectoring logic 565 (FIG. 12) to cancel COXT that couples between the connections 425 and 426. In this regard, consider an example in which the network-side transceiver 605 receives a downstream tone, referred to as "victim tone" in this example, affected by COXT that couples from downstream tones, referred to as "downstream interfering tones" in this example, transmitted across the drop connections 444. A set of vectoring coefficients 667 corresponding to the victim tone includes coefficients associated with the downstream interfering tones transmitted across the drop connections 444 by the drop transceivers 656 and 657. The vectoring logic 665 is configured to combine (e.g., multiply) the respective symbol of each downstream interfering tone transmitted across the drop connections 444 with its associated vectoring coefficient to determine a respective crosstalk contribution that is combined with (e.g., subtracted from) the symbol of the victim tone to cancel the COXT induced by the downstream interfering tone.

Further, consider an example in which the drop transceiver 656 receives an upstream tone, referred to as "victim tone" in this example, affected by COXT that couples from upstream tones, referred to as "upstream interfering tones" in this example, transmitted across the trunk connections 426. A set of vectoring coefficients 667 corresponding to the victim tone includes coefficients associated with the upstream interfering tones transmitted across the trunk connections 426 by the network-side transceivers 605-609. The vectoring logic 665 is configured to combine (e.g., multiply) the respective symbol of each upstream interfering tone transmitted across the trunk connections 426 with its associated vectoring coefficient to determine a respective crosstalk contribution that is combined with (e.g., subtracted from) the symbol of the victim tone to cancel the COXT induced by the upstream interfering tones. Thus, the vectoring logic 665 is configured to cancel COXT that couples in both directions between the connections 426 and 444.

Note that vectoring between any of the transceivers described above is generally simplified if each transceiver has the same modulation format. It is possible, however, for vectoring to occur between transceivers employing different modulation formats, though the vectoring calculations may be more complicated. For example, it is possible for the drop transceivers 656 and 657 to employ VDSL while the CP-side trunk transceivers 635-637 employ VDSL2 and for vectoring to be performed to cancel crosstalk that couples from the trunk connections 427 to the drop connections 444 and vice versa.

Also note that the service unit 434 (FIG. 11) is configured similar to the service unit 433 of FIG. 14 except that the service unit 434 has no trunk transceivers or a bonding engine on a CP side of the service unit 474, similar to the CP-side trunk transceivers 635-637 and bonding engine 627 of FIG. 14. In addition, it should be emphasized that various design changes to the embodiment shown by FIGS. 11-14 are possible. As an example, the number of components, such as connections and transceivers shown by FIGS. 11-14, may be changed in any manner in order to provide a desired capacity. Further, drop connections may be connected to any DP, and there may be any number of DPs daisy-chained together. Various other design changes would be apparent to a person of ordinary skill upon reading this disclosure.

As a mere example, it is possible to use point-to-multipoint connections (not shown) to communicate multicast flows to the DPs 422-424, as described in commonly-assigned U.S. patent application Ser. No. 12/839,402, entitled "Communication Systems and Methods for Using Shared Channels to Increase Peak Data Rates" and filed on Jul. 19, 2010, which is incorporated herein by reference. In this regard, multicast flows may be communicated via such point-to-multipoint connections while unicast flows are communicated via the point-to-point connections 425-427 shown by FIG. 11. However, it is possible for any unicast flow to be communicated by the point-to-multipoint connections and for multicast flows to be communicated by the connections 425-427. In other embodiments, yet other design changes are possible.

As described above, each service unit 432-434 respectively comprises a control element 472-474 and stores configuration data 475-477. The configuration data 475-477 is indicative of the resources, capacities, and constraints of the service unit in which it is stored. As an example, the configuration data within a given service unit may indicate the number of ports in the service unit, a maximum data rate for each port, and service level agreement (SLA) information specifying performance parameters, such as minimum data rate, maximum burst rate, etc. guaranteed to customers. The control elements 472-474 control the operation of the service units 432-434, such as transmission bandwidth, in an attempt to ensure that there is sufficient capacity to accommodate the traffic on the trunk 463 and to ensure that the specified performance parameters are satisfied. As an example, the control elements 472-474 may allocate bandwidth or control the data rates of service units 432-433 based on the configuration data 475-477. The control elements 472-474 may also establish priorities and other parameters for handling congestion.

In one exemplary embodiment, the control elements 472-474 are configured to control the data rates of the trunk transceivers to ensure that there is sufficient capacity to handle the traffic carried by the trunk 463 while ensuring that specified performance parameters are satisfied and to determine an amount of available capacity for each leg of the trunk 463 that can be used for error correction. The control elements 472-474 then selectively establish a level or type of error correction for each leg of the trunk 463 based on the available capacity.

In this regard, each control element 472-474 is configured to determine a guaranteed aggregate service rate in each direction for each trunk leg coupled to its respective service unit 432-434. As an example, the control element 472 based on the configuration data 475 or otherwise determines the guaranteed aggregate service rate for upstream communication across the bonding group 429 and the guaranteed aggregate service rate for downstream communication across the bonding group 430. Similarly, the control element 473 based on the configuration data 476 or otherwise determines the guaranteed aggregate service rates for upstream communication across the bonding group 430, and the guaranteed aggregate service rate for downstream communication across the bonding group 431. Further, the control element 474 based on the configuration data 477 or otherwise determines the guaranteed aggregate service rate for upstream communication across the bonding group 431.

Note that the guaranteed aggregate service rate for a bonding group is the minimum aggregate data rate that is guaranteed for the traffic of services propagating across the bonding group, and the guaranteed service rate of a drop connection is the minimum data rate that is guaranteed for the traffic of services provided to the customer premises across such drop connection. Further, the guaranteed aggregate service rate across a bonding group is generally a function of the guaranteed service rates of the drop connections located downstream from the bonding group. Further, the guaranteed aggregate service rate across a bonding group may also be a function of the physical capabilities of the service unit as well as the specified performance parameters that should be maintained by the service unit.

As an example, based on the physical configuration of the service unit 433, including the number of connections 426, 427, and 444 coupled to the service unit 433 and the types of transceivers employed within the service unit 433, assume that in the downstream direction the service unit 433 is capable of (1) receiving up to 50 Mega-bits-per-second (Mbps) from the trunk connections 426, (2) transmitting up to 75 Mbps across the trunk connections 427, and (3) transmitting up to 100 Mbps across the drop connections 444. In such an example, the guaranteed aggregate service rate for the bonding group 431 in the downstream direction cannot be higher than 75 Mbps due to the fact that the total downstream capacity of the bonding group 431 is 75 Mbps. Further, the guaranteed aggregate service rate for the bonding group 431 in the downstream direction cannot be higher than 50 Mbps due to the fact that the service unit 433 cannot receive more that 50 Mbps from the bonding group 430, which is the service unit's only downstream source in the exemplary embodiment depicted by FIG. 11.

In addition, for illustrative purposes, assume that the specified performance parameters indicated by the configuration data 476 guarantee a total service rate of 10 Mbps in the downstream direction for all of the drop connections 444 and that the specified performance parameters indicated by the configuration data 477 guarantee a total service rate of 20 Mbps in the downstream direction for all of the drop connections 455. That is, the sum of the guaranteed service rates for drop connections 444 is 10 Mbps, and the sum of the guaranteed service rates for all drop connections 455 is 20 Mbps. In such an example, since service unit 434 is the last service unit connected by the series of bonding groups forming trunk 463, the guaranteed aggregate service rate for the bonding group 431 in the downstream direction is the sum of the guaranteed service rates for all drop connections 455 or, in other words, 20 Mbps. For the service unit 433, the guaranteed aggregate service rate is the sum of the guaranteed aggregate service rate of the bonding group 431 and the sum of the guaranteed service rates for all of the drop connections 444 in the downstream direction. Thus, assuming a guaranteed aggregate service rate of 20 Mbps for the bonding group 431, the guaranteed aggregate service rate for the bonding group 430 downstream is 30 Mbps or, in other words, 20 Mbps+10 Mbps. For the service unit 432, since there are no drop connections serviced by this unit 432, the guaranteed aggregate service rate for the bonding group 429 downstream is equal to the guaranteed aggregate service rate for the bonding group 430 downstream. In other examples, other techniques for determining the guaranteed aggregate service rate for any given trunk leg are possible.

In one exemplary embodiment, the control elements 472-474 are configured to communicate with each other via a control channel or otherwise in order to pass information indicative of the guaranteed aggregate service rates for the trunk 463 and the guaranteed service rates of the drop connections 444 and 455 so that each control element 472-474 can make capacity and rate decisions based on the configurations and capacities of other distribution points. The control elements 472-474 then control error correction capabilities based on the service rate decisions.

As an example, using techniques described above, assume that the control element 472 determines that it is capable of delivering 50 Mbps across the bonding group 430 to the service unit 433 and that all of the connections 426 of the bonding group 430 are coupled between the service units 432 and 433. In such case, the control element 472 could select its guaranteed aggregate service rate for the bonding group in the downstream direction to be 50 Mbps. However, further assume that the control element 473, based on the configuration and capacity of the service unit 433 as well as the performance requirements for the drop connections 444 determines that the guaranteed aggregate service rate for the bonding group 431 is 20 Mbps and that the sum of the guaranteed service rates for all of the drop connections 444 coupled to the service unit 433 is 10 Mbps. In such an example, it is unnecessary for the service unit 432 to guarantee a service rate of 50 Mbps since the next service unit 433 only guarantees a total of 30 Mbps for the next trunk leg defined by bonding group 431 and the drop connections 444. In the instant example, the control element 472, based on control information pertaining to the guaranteed service rates selected by the control element 473 for the service unit 33, preferably selects 30 Mbps as its guaranteed aggregate service rate downstream across the bonding group 430, thereby providing 20 Mbps of excess capacity that can be used for purposes other than the communication of payload data.

For each leg of the trunk 463, the control elements 472-474 are configured to use excess capacity in order to transmit parity information, such as forward error correction (FEC) code words that can be used to correct for transmission errors. For example, in the embodiment described above in which there is excess capacity of 20 Mbps in the downstream direction for the leg between the service units 432 and 433, the control element 472 is configured to control the service unit 432 such that parity information of up to 20 Mbps is appended to the data packets transmitted from the service unit 472 to the service unit 473. In this regard, the control element 472 sets the parity level for the communication occurring across the bonding group 430 such that, when the service unit 432 is transmitting 30 Mbps across the bonding group 430, it should also be transmitting 20 Mbps of parity information. Using such parity information, the service unit 473 is able to correct for at least some errors thereby enhancing the quality of the downstream channel defined by the bonding group 430. In general, the greater that the excess capacity is for any given leg, the more parity information that can be inserted into the data channel thereby increasing the quality of the data channel. Since error correction is enabled only to the extent that excess capacity allows, the use of parity information for at least some legs should not adversely affect the effective data rate of the trunk 463.

An exemplary use and operation of the system 400 in controlling error correction in the downstream direction will now be described below with particular reference to FIG. 15. Similar techniques may be used by the control elements 472-474 to control error correction in the upstream direction.

Initially, the control element 474 determines, based on the configuration data 477, the guaranteed service rate for each drop connection 455 in the downstream direction while ensuring that the determined guaranteed service rate for each respective drop connection 455 is equal to or less than the downstream capacity for such drop connection 455. The control element 474 sums the guaranteed service rates for all of the drop connections 455 coupled to the service unit 434 and transmits such sum via a control channel of the bonding group 431 to the service unit 433.

Figure 15:
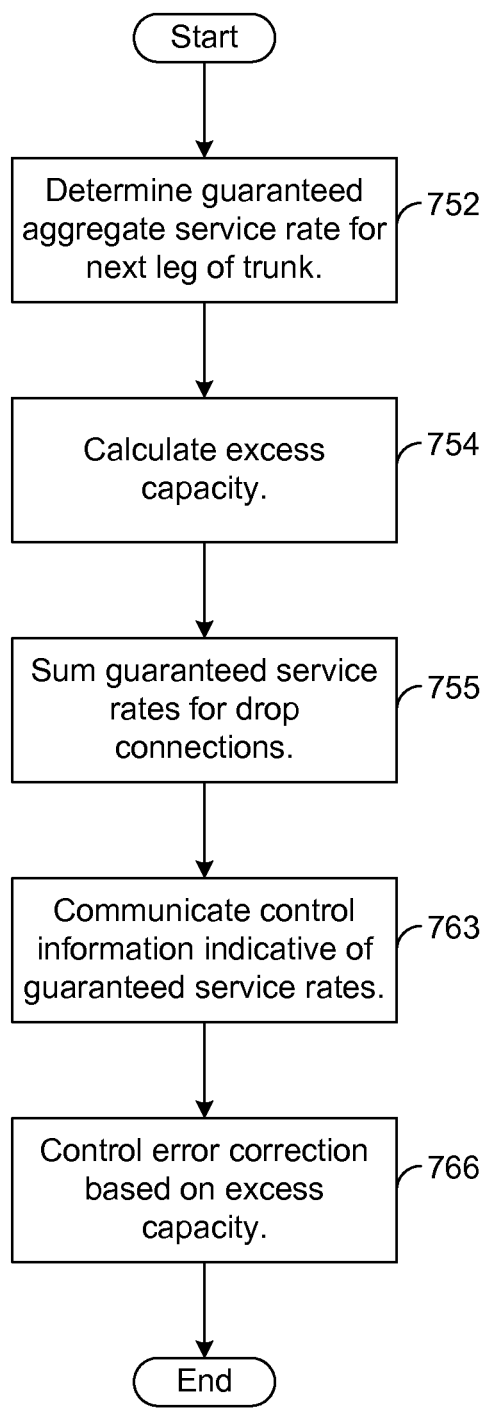
FIG. 15 is a flowchart illustrating an exemplary method of controlling error correction in a communication system, such as is depicted by FIG. 11.

The control element 473 is configured to determine the guaranteed aggregate service rate for the bonding group 431 in the downstream direction based on the control information received from the service unit 434, as shown by block 752 of FIG. 15. In this regard, the control element 473 determines the downstream capacity of the bonding group 431 based on the configuration data 476 or otherwise, and selects the guaranteed aggregate service rate for the bonding group 431 to be the minimum of the total downstream capacity of the bonding group 431 and the sum of the guaranteed service rates of the drop connections 455, as indicated by the control information transmitted to the service unit 433 from the service unit 434.

After determining the guaranteed aggregate service rate for the bonding group 431, the control element 473 calculates the excess capacity for the bonding group 431 in the downstream direction, as shown by block 754 of FIG. 15. Such excess capacity is equal to the difference between the total downstream capacity for the bonding group 431, as indicated by the configuration data 476 or otherwise, and the guaranteed aggregate service rate selected by the control element 473 for the bonding group 431 in the downstream direction.

The control element 473 also determines, based on the configuration data 476, the guaranteed service rate for each drop connection 444 in the downstream direction while ensuring that the determined guaranteed service rate for each respective drop connection 444 is equal to or less than the downstream capacity for such drop connection 444. The control element 473 sums the guaranteed service rates for all of the drop connections 444 coupled to the service unit 433 and transmits such sum via a control channel of the bonding group 430 to the service unit 432, as shown by blocks 755 and 763 of FIG. 15, thereby enabling the control element 472 to consider such guaranteed service rates when selecting the guaranteed aggregate service rate in the downstream direction for the bonding group 430.

The control element 473 also establishes error correction for the bonding group 431 based on the excess capacity calculated in block 754. In one exemplary embodiment, the control element 473 uses all of the excess capacity for communicating parity information. Thus, the control element 473 controls the format of the packets transmitted downstream across the bonding group 431 such that data rate for transmitting the parity information is equal to the data rate corresponding to the excess capacity calculated in block 754. If desired, less amount of parity information may be communicated, thereby preserving at least some of the excess capacity for other purposes.

The control element 472 of the service unit 432 is configured to utilize similar techniques to determine the guaranteed aggregate service rate for the bonding group 430 in the downstream direction. Note that there are no drop connections coupled directly to the service unit 432. Thus, there are no service rates to sum in block 755 of FIG. 15.

It should be emphasized that the embodiments described herein are exemplary. As an example, bonding is described as providing shared channels for the trunk 263. However, other techniques, such as multiple-input and multiple-output (MIMO) communication techniques, may be used to provide shared channels for the trunk 463. Also, having an optical fiber 54 (FIG. 2) is unnecessary. As an example, the DP 422 may be coupled to a central office without the use of fiber. Various other design changes and modifications would be apparent to one of ordinary skill upon reading this disclosure.

Now, therefore, the following is claimed:

1. A communication system, comprising:
   a first distribution point positioned along a trunk extending from a network facility, the first distribution point having a first service unit coupled to a first plurality of communication connections of the trunk and configured to receive from the first plurality of communication connections a plurality of data flows destined for customer premises (CP) transceivers at a plurality of customer premises, each of the first plurality of communication connections shared by each of at least a first plurality of the CP transceivers; and
   a second distribution point positioned along the trunk and having a second service unit coupled to the first service unit via a second plurality of communication connections of the trunk, each of the second plurality of communication connections shared by each of at least a second plurality of the CP transceivers,
   wherein the first service unit is configured to employ crosstalk vectoring to cancel crosstalk affecting signals communicated across the first plurality of communication connections, wherein the first service unit is configured to employ crosstalk vectoring to cancel crosstalk affecting signals communicated across the second plurality of communication connections, wherein the first service unit has a control element configured to receive control information from the second service unit, wherein the control element is configured to determine, based on the control information, an amount of excess capacity that exceeds a guaranteed aggregate service rate for communicating across the second plurality of connections, and wherein the control element is configured to control error correction for signals communicated across the second plurality of communication connections based on the determined amount of excess capacity.

2. The system of claim 1, wherein one of the first plurality of CP transceivers is coupled to the first service unit via a drop connection extending from the first service unit to the one of the first plurality of CP transceivers.

3. The system of claim 2, wherein the first service unit is configured to employ crosstalk vectoring to cancel crosstalk that couples between the drop connection and at least one of the first and second plurality of communication connections.

4. The system of claim 1, further comprising a third distribution point positioned along the trunk and having a third service unit coupled to the second service unit via a third plurality of communication connections, wherein the second service unit is configured to employ crosstalk vectoring to cancel crossover crosstalk that couples between the second plurality of connections and the third plurality of connections.

5. The system of claim 1, wherein the first service unit is configured to bond the first plurality of communication connections, thereby forming a first bonding group, and to bond the second plurality of communication connections, thereby forming a second bonding group.

6. The system of claim 1, wherein the first service unit is configured to use a modulation format for communication across the first plurality of communication connection, and wherein the second service unit is configured to use the modulation format for communication across the second plurality of communication connections.

7. The system of claim 6, wherein the modulation format is very-high-bit-rate digital subscriber line (VDSL).

8. The system of claim 1, wherein each of the first and second plurality of communication connections comprises a twisted wire pair.

9. A communication system, comprising:
a first distribution point positioned along a trunk extending from a network facility, the first distribution point having a first service unit coupled to a first plurality of communication connections of the trunk and configured to receive from the first plurality of communication connections a plurality of data flows destined for customer premises (CP) transceivers at a plurality of customer premises, each of the first plurality of communication connections shared by each of at least a first plurality of the CP transceivers; and
a second distribution point positioned along the trunk and having a second service unit coupled to the first service unit via a second plurality of communication connections of the trunk, each of the second plurality of communication connections shared by each of at least a second plurality of the CP transceivers,
wherein the first service unit is configured to employ crosstalk vectoring to cancel crosstalk affecting signals communicated across the first plurality of communication connections, wherein the first service unit is configured to employ crosstalk vectoring to cancel crosstalk affecting signals communicated across the second plurality of communication connections, and wherein the first service unit is configured to employ crosstalk vectoring to cancel crossover crosstalk that couples between the first plurality of communication connections and the second plurality of communication connections.

10. A communication system, comprising:
a first distribution point positioned along a trunk extending from a network facility, the first distribution point having a first service unit coupled to a first plurality of communication connections of the trunk and configured to receive from the first plurality of communication connections a plurality of data flows destined for customer premises (CP) transceivers at a plurality of customer premises, each of the first plurality of communication connections shared by each of at least a first plurality of the CP transceivers; and
a second distribution point positioned along the trunk and having a second service unit coupled to the first service unit via a second plurality of communication connections of the trunk, each of the second plurality of communication connections shared by each of at least a second plurality of the CP transceivers,
wherein the first service unit is configured to employ crosstalk vectoring to cancel crosstalk affecting signals communicated across the first plurality of communication connections, wherein the first service unit is configured to employ crosstalk vectoring to cancel crosstalk affecting signals communicated across the second plurality of communication connections, and wherein a total number of communication connections connecting the first service unit to the second service unit is greater than a total number of communication connections connecting the second service unit to the third service unit.

11. A communication system, comprising:
a first distribution point positioned along a trunk extending from a network facility, the first distribution point having a first service unit coupled to a first plurality of communication connections of the trunk and configured to receive from the first plurality of communication connections a plurality of data flows destined for customer premises (CP) transceivers at a plurality of customer premises, each of the first plurality of communication connections shared by each of at least a first plurality of the CP transceivers; and
a second distribution point positioned along the trunk and having a second service unit coupled to the first service unit via a second plurality of communication connections of the trunk, each of the second plurality of communication connections shared by each of at least a second plurality of the CP transceivers,
wherein the first service unit is configured to employ crosstalk vectoring to cancel crosstalk affecting signals communicated across the first plurality of communication connections, wherein the first service unit is configured to employ crosstalk vectoring to cancel crosstalk affecting signals communicated across the second plurality of communication connections, and wherein the first service unit has a control element configured to receive from the second service unit control information indicative of guaranteed service rates for the second service unit, and wherein the control element is configured to control error correction for signals communicated across the second plurality of communication connections based on the control information.

12. The system of claim 11, wherein the control element is configured to select, based on the control information, a guaranteed aggregate service rate for the second plurality of communication connections.

13. The system of claim 12, wherein the control element is configured to determine a difference between the guaranteed aggregate data rate for the second plurality of communication connections and a total capacity of the second plurality of communication connections, and wherein the control element is configured to control the error correction based on the difference.

14. A method, comprising:
receiving, at a first service unit of a first distribution point of a network, a plurality of data flows from a first plurality of communication connections of a network trunk coupled to the first service unit, wherein the data flows are destined for customer premises (CP) transceivers at a plurality of customer premises, and wherein each of the first plurality of communication connections is shared by each of at least a first plurality of the CP transceivers;
transmitting at least one of the data flows from the first service unit to a second service unit at a second distribution point of the network via a second plurality of communication connections of the network trunk, wherein each of the second plurality of communication connections is shared by each of at least a second plurality of the CP transceivers;
performing crosstalk vectoring to cancel crosstalk affecting signals communicated across the first plurality of communication connections;
performing crosstalk vectoring to cancel crosstalk affecting signals communicated across the second plurality of communication connections;
receiving, at the first service unit, control information from the second service unit;
determining, based on the control information, a value indicative of a guaranteed aggregate service rate for communicating across the second plurality of connections; and
controlling error correction signals communicated across the second plurality of communication connections based on the value.

15. The method of claim 14, wherein one of the first plurality of CP transceivers is coupled to the first service unit via a drop connection extending from the first service unit to the one of the first plurality of CP transceivers.

16. The method of claim 15, further comprising performing crosstalk vectoring to cancel crosstalk that couples between the drop connection and at least one of the first and second plurality of communication connections.

17. The method of claim 14, further comprising:
transmitting at least one of the data flows from the second service unit to a third service unit at a third distribution point of the network via a third plurality of communication connections of the network trunk; and
performing crosstalk vectoring to cancel crossover crosstalk that couples between the second plurality of communication connection and the third plurality of communication connections.

18. The method of claim 14, further comprising:
bonding the first plurality of communication connections, thereby forming a first bonding group; and
bonding the second plurality of communication connections, thereby forming a second bonding group.

19. The method of claim 14, wherein each of the first and second plurality of communication connections comprises a twisted wire pair.

20. A method, comprising:
receiving, at a first service unit of a first distribution point of a network, a plurality of data flows from a first plurality of communication connections of a network trunk coupled to the first service unit, wherein the data flows are destined for customer premises (CP) transceivers at a plurality of customer premises, and wherein each of the first plurality of communication connections is shared by each of at least a first plurality of the CP transceivers;
transmitting at least one of the data flows from the first service unit to a second service unit at a second distribution point of the network via a second plurality of communication connections of the network trunk, wherein each of the second plurality of communication connections is shared by each of at least a second plurality of the CP transceivers;
performing crosstalk vectoring to cancel crosstalk affecting signals communicated across the first plurality of communication connections;
performing crosstalk vectoring to cancel crosstalk affecting signals communicated across the second plurality of communication connections; and
performing crosstalk vectoring to cancel crossover crosstalk that couples between the first plurality of communication connections and the second plurality of communication connections.

21. A method, comprising:
receiving, at a first service unit of a first distribution point of a network, a plurality of data flows from a first plurality of communication connections of a network trunk coupled to the first service unit, wherein the data flows are destined for customer premises (CP) transceivers at a plurality of customer premises, and wherein each of the first plurality of communication connections is shared by each of at least a first plurality of the CP transceivers;
transmitting at least one of the data flows from the first service unit to a second service unit at a second distribution point of the network via a second plurality of communication connections of the network trunk, wherein each of the second plurality of communication connections is shared by each of at least a second plurality of the CP transceivers;
performing crosstalk vectoring to cancel crosstalk affecting signals communicated across the first plurality of communication connections;
performing crosstalk vectoring to cancel crosstalk affecting signals communicated across the second plurality of communication connections,
transmitting at least one of the data flows from the second service unit to a third service unit at a third distribution point of the network via a third plurality of communication connections of the network trunk; and
performing crosstalk vectoring to cancel crossover crosstalk that couples between the second plurality of communication connection and the third plurality of communication connections,
wherein a total number of communication connections connecting the first service unit to the second service unit is greater than a total number of communication connections connecting the second service unit to the third service unit.

22. A method, comprising:
receiving, at a first service unit of a first distribution point of a network, a plurality of data flows from a first plurality of communication connections of a network trunk coupled to the first service unit, wherein the data flows are destined for customer premises (CP) transceivers at a plurality of customer premises, and wherein each of the first plurality of communication connections is shared by each of at least a first plurality of the CP transceivers;
transmitting at least one of the data flows from the first service unit to a second service unit at a second distribution point of the network via a second plurality of communication connections of the network trunk, wherein each of the second plurality of communication connections is shared by each of at least a second plurality of the CP transceivers;
performing crosstalk vectoring to cancel crosstalk affecting signals communicated across the first plurality of communication connections;
performing crosstalk vectoring to cancel crosstalk affecting signals communicated across the second plurality of communication connections;
transmitting at least one of the data flows from the second service unit to a third service unit at a third distribution point of the network via a third plurality of communication connections of the network trunk;

determining a guaranteed aggregate service rate for the third plurality of communication connections;

determining a guaranteed service rate for at least one drop connection coupled to the second service unit;

transmitting control information from the second service unit to the first service unit, the control information based on the guaranteed aggregate service rate and the at least one guaranteed service rate; and determining a guaranteed aggregate service rate for the second plurality of communication connections based on the control information.

* * * * *